(12) United States Patent
Hirano

(10) Patent No.: US 7,532,797 B2
(45) Date of Patent: May 12, 2009

(54) OPTICAL FIBER

(75) Inventor: Masaaki Hirano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 20 days.

(21) Appl. No.: 11/791,702

(22) PCT Filed: Aug. 22, 2006

(86) PCT No.: PCT/JP2006/316391

§ 371 (c)(1),
(2), (4) Date: May 25, 2007

(87) PCT Pub. No.: WO2007/023801

PCT Pub. Date: Mar. 1, 2007

(65) Prior Publication Data

US 2008/0166097 A1    Jul. 10, 2008

(30) Foreign Application Priority Data

Aug. 22, 2005    (JP) ............................. 2005-240063

(51) Int. Cl.
G02B 6/02    (2006.01)

(52) U.S. Cl. ....................... 385/123; 385/124; 385/125; 385/126; 385/127

(58) Field of Classification Search .......... 385/123–127
See application file for complete search history.

(56) References Cited

U.S. PATENT DOCUMENTS

| | | | |
|---|---|---|---|
| 5,847,863 A | 12/1998 | Galvanauskus et al. | |
| 6,522,821 B1 * | 2/2003 | Hirano et al. | 385/127 |
| 6,885,683 B1 | 4/2005 | Fermann et al. | |
| 2004/0190119 A1 | 9/2004 | Tauser et al. | |

(Continued)

FOREIGN PATENT DOCUMENTS

JP    10-73851 A    3/1998

(Continued)

OTHER PUBLICATIONS

M.E. Fermann et al., "Third-order dispersion control in ultrafast Yb fiber amplifiers," Advanced Solid State Laser Topical Meeting in Seattle, 2001, Tech. Digest Tu A3, p. 355-358.

(Continued)

*Primary Examiner*—Jennifer Doan
(74) *Attorney, Agent, or Firm*—McDermott Will & Emery LLP

(57) ABSTRACT

The present invention relates to an optical fiber for light pulse expansion in which the ratio $(\beta_3/\beta_2)$ of the third derivative $\beta_3$ to the second derivative $\beta_2$ is negative, the absolute value thereof is large, and the absolute value of the second derivative $\beta_2$ is also large. Such an optical fiber comprises at least a central core portion having a maximum refractive index $N_1$ and an outer diameter $2a$, a depressed portion, provided on the outer periphery of the central core portion, having a minimum refractive index $N_2$ and an outer diameter $2b$, and a cladding portion, provided on the outer periphery of the depressed portion, having a maximum refractive index $N_3$. The respective maximum refractive indices of the central core portion, the depressed portion and the cladding portion satisfy the relationship "$N_1 > N_3 > N_2$".

9 Claims, 22 Drawing Sheets

U.S. PATENT DOCUMENTS

2005/0111500 A1     5/2005     Harter et al.
2007/0053641 A1*    3/2007     Hirano et al. ............... 385/124

FOREIGN PATENT DOCUMENTS

| JP | 2002-118315 A | 4/2002 |
| JP | 2002-293563 A | 10/2002 |
| JP | 2003-270469 A | 9/2003 |

OTHER PUBLICATIONS

B. James Ainslie et al., "A Review of Single-Mode Fibers with Modified Dispersion Characteristics," Journal of Lightwave Technology, vol. LT-4, No. 8, Aug. 1986, p. 967-979.

Kane, S. et al, "Chirped-pulse amplification with a fiber stretcher and a grism compressor," Conference on Lasers and Electro-Optics, CLEO '96, Technical Digest, Jun. 1996, vol. 9, p. 186-187.

Kane, S. et al, "Grating Compensation of Third-Order Material Dispersion in the Normal Dispersion Regime: Sub- 100-fs Chirped-Pulse Amplification Using a Fiber Stretcher and Grating-Pair Compressor," IEEE Journal of Quantum Electronics, vol. 31, No. 11, Nov. 1995, p. 2052-2057.

Strickland, D. et al, "Compression of Amplified Chirped Optical Pulses," Optics Communications, vol. 56, No. 3, Dec. 1, 1985, p. 219-221, Elsevier Science Publishers B.V.

Imeshev, G. et al, "Chirped pulse amplification with a nonlinearly chirped fiber Bragg grating matched to the Treacy compressor," Optics Letters, Apr. 1, 2004, vol. 29, No. 7, p. 679-681.

\* cited by examiner

Fig.12

| SAMPLE | Δ1 % | Δ2 % | Ra | OUTER DIAMETER OF CENTRAL CORE PORTION μm | β ps²/km | β ps³/km | β3/β2 ps | MFD(I) μm | Aeff μm² | BENDING LOSS dB/m (AT DIAMETER OF 40 mm) | BENDING LOSS dB/m (AT DIAMETER OF 60 mm) |
|---|---|---|---|---|---|---|---|---|---|---|---|
| 1 | 1.0 | -0.7 | 0.57 | 3.38 | 56 | -0.15 | -0.0026 | 4.3 | 9.9 | 0.35 | 0.0009 |
| 2 | 1.5 | -0.5 | 0.35 | 2.58 | 58 | -0.12 | -0.0021 | 3.2 | 6.3 | 0.02 | 0.00005 |
| 3 | 1.5 | -0.7 | 0.60 | 2.50 | 103 | -0.23 | -0.0022 | 4.6 | 8.5 | 0.09 | 0.0002 |
| 4 | 1.7 | -0.5 | 0.37 | 2.32 | 83 | -0.21 | -0.0025 | 3.5 | 6.5 | 0.001 | |
| 5 | 1.7 | -0.5 | 0.37 | 2.27 | 93 | -0.29 | -0.0032 | 3.8 | 6.6 | 0.13 | 0.0004 |
| 6 | 2.0 | -0.3 | 0.30 | 1.96 | 105 | -0.21 | -0.0020 | 3.8 | 6.7 | 0.003 | |
| 7 | 2.0 | -0.5 | 0.35 | 2.01 | 119 | -0.44 | -0.0037 | 3.8 | 6.1 | 0.45 | 0.001 |
| 8 | 2.0 | -0.5 | 0.35 | 2.08 | 99 | -0.25 | -0.0026 | 3.4 | 5.7 | 0.0001 | |
| 9 | 2.0 | -0.7 | 0.43 | 2.03 | 156 | -0.88 | -0.0056 | 4.3 | 6.2 | 24 | 0.05 |
| 10 | 2.0 | -0.7 | 0.45 | 2.05 | 149 | -0.66 | -0.0044 | 4.2 | 6.3 | 2.2 | 0.004 |
| 11 | 2.0 | -0.7 | 0.45 | 2.07 | 141 | -0.58 | -0.0041 | 4.1 | 6.1 | 0.40 | 0.0008 |
| 12 | 2.0 | -0.7 | 0.45 | 2.1 | 121 | -0.42 | -0.0035 | 3.7 | 5.8 | 0.001 | |
| 13 | 2.5 | -0.4 | 0.30 | 1.68 | 152 | -0.49 | 0.0032 | 3.9 | 5.8 | 0.21 | 0.0004 |
| 14 | 2.5 | -0.5 | 0.30 | 1.68 | 175 | -0.95 | -0.0054 | 4.1 | 5.6 | 52 | 0.10 |
| 15 | 2.5 | -0.5 | 0.33 | 1.70 | 170 | -0.76 | -0.0045 | 4.0 | 5.6 | 4.0 | 0.009 |
| 16 | 2.5 | -0.5 | 0.33 | 1.72 | 160 | -0.64 | -0.0040 | 3.8 | 5.5 | 0.42 | 0.0006 |
| 17 | 2.5 | -0.5 | 0.33 | 1.75 | 149 | -0.46 | -0.0031 | 3.6 | 5.3 | 0.002 | |
| 18 | 2.5 | -0.5 | 0.35 | 1.77 | 142 | -0.41 | -0.0029 | 3.5 | 5.2 | 0.0001 | |
| 19 | 2.5 | -0.7 | 0.35 | 1.78 | 158 | -0.82 | -0.0052 | 3.5 | 4.8 | 0.32 | 0.0004 |
| 20 | 2.5 | -0.3 | 0.25 | 1.82 | 138 | -0.56 | -0.0040 | 3.2 | 4.6 | 0.001 | |
| 21 | 3.0 | -0.5 | 0.20 | 1.45 | 173 | -0.43 | -0.0025 | 4.0 | 5.7 | 0.11 | 0.0005 |
| 22 | 3.0 | -0.7 | 0.35 | 1.53 | 138 | -0.40 | -0.0029 | 2.9 | 4.3 | 0.01 | 0.00002 |
| 23 | 3.0 | -0.7 | 0.33 | 1.53 | 261 | -1.80 | -0.0069 | 4.4 | 5.1 | 75 | 0.15 |
| 24 | 3.0 | -0.7 | 0.40 | 1.57 | 200 | -1.10 | -0.0055 | 3.5 | 4.3 | 0.27 | 0.0005 |
| 25 | 3.0 | -0.7 | 0.33 | 1.58 | 208 | -0.73 | -0.0035 | 3.7 | 4.7 | 0.001 | |
| 26 | 3.0 | -0.7 | 0.33 | 1.61 | 186 | -0.67 | -0.0036 | 3.3 | 4.3 | 0.00001 | |

Fig.17
(a)
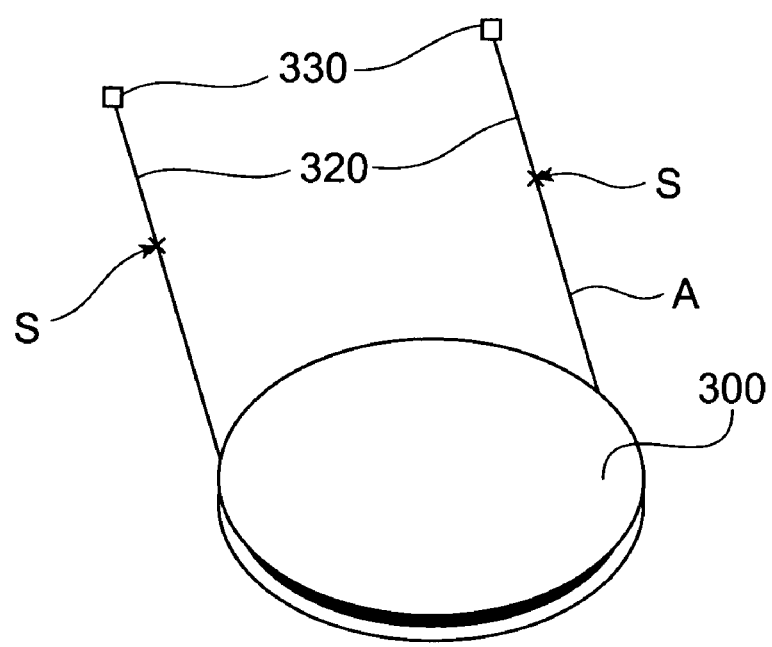
(b)
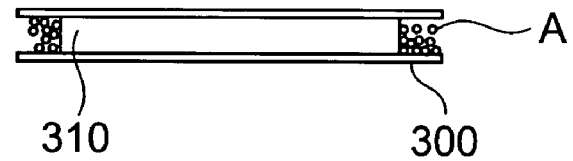

OPTICAL FIBER

RELATED APPLICATIONS

This application is the U.S. National Phase under 35 U.S.C. § 371 of International Application No. PCT/JP2006/316391, filed on Aug. 22, 2006, which in turn claims the benefit of Japanese Application No. 2005-240063, filed on Aug. 22, 2005, the disclosures of which Applications are incorporated by reference herein.

TECHNICAL FIELD

The present invention relates to an optical fiber having an unique dispersion characteristic in 1-μm wavelength band.

BACKGROUND ART

In the pulse compression technology described in Non-patent Document 1, a pulse laser beam (hereinafter simply referred to as light pulse) outputted from an optical fiber laser source with a central wavelength of 1.06 μm is amplified by an Yb-doped optical fiber amplifier, the light pulse thus amplified is expanded by an optical fiber, and then the light pulse is compressed by a diffraction grating. By using such light pulse compression technology, femtosecond laser sources, whose pulse width is 100 fs or less at a wavelength of 1.06 μm, can be obtained. The optical fiber used for expanding light pulses in Non-patent Document 1 had a $\beta_2$ of 0.10 $ps^2/m$ and a $\beta_3$ of $-0.00018$ $ps^3/m$ at the wavelength of 1.06 μm.

Herein $\beta_n$ is the n-th derivative of the propagation constant $\beta$ with respect to frequency $\omega$. That is, the propagation constant $\beta$ is given by following formula (1) as a Taylor expansion around the central frequency $\omega_0$ of the light pulse, while the n-th derivative $\beta_n$ at the frequency $\omega_0$ is given by the following formula (2). The following formula (3) and formula (4) define the relationship between the chromatic dispersion D, the dispersion slope S and the second derivative $\beta_2$ and the third derivative $\beta_3$, so that the latter can be mutually converted on the basis of the formulas. In the formulas, c is the speed of light in vacuum, $\pi$ is the circular constant, and $\lambda$ is the wavelength of the light.

[Formula 1]

$$\beta = \beta_0 + \sum_{n=1}^{\infty} \frac{1}{n!} \beta_n (\omega - \omega_0)^n \quad (1)$$

$$= \beta_0 + \beta_1(\omega - \omega_0) + \frac{1}{2}\beta_2(\omega - \omega_0)^2 + \frac{1}{6}\beta_3(\omega - \omega_0)^3 + \ldots$$

[Formula 2]

$$\beta_n = \left. \frac{d^n \beta}{d\omega^n} \right|_{\omega=\omega_0} \quad (2)$$

[Formula 3]

$$D = -\frac{2\pi c}{\lambda^2} \beta_2 \quad (3)$$

[Formula 4]

$$S = \frac{4\pi c}{\lambda^3} \left( \beta_2 + \frac{\pi c}{\lambda} \cdot \beta_3 \right) \quad (4)$$

Standard single-mode optical fibers, which are used ordinarily in optical transmission and have a zero-dispersion wavelength in the vicinity of the wavelength of 1.3 μm, exhibit a second derivative $\beta_2$ of 0.02 $ps^2/m$ and a third derivative $\beta_3$ of 0.00004 $ps^3/m$ at the wavelength of 1.06 μm. As compared with such standard single-mode optical fibers, optical fibers used for expanding light pulses, such as the one described in Non-patent Document 1 (hereinafter referred to as optical fiber for light pulse expansion) have a second derivative $\beta_2$ of the same sign (positive) and a third derivative $\beta_3$ of the opposite sign (negative). Patent Document 1: Japanese Patent Application Laid-open No. 2002-293563 Non-patent Document 1: M. E. Fermann, et al., Advanced Solid-State Lasers Topical Meeting in Seattle, 2001, Technical Digest TuA3, pp. 355-358

DISCLOSURE OF THE INVENTION

Problems that the Invention is to Solve

The present inventors have examined conventional optical fibers for light pulse expansion, and as a result, have discovered the following problems. That is, in order to expand a light pulse in a short fiber length and with good efficiency using such optical fibers for light pulse expansion, it is preferable that the ratio ($\beta_3/\beta_2$) of the third derivative $\beta_3$ to the second derivative $\beta_2$ be negative, that the absolute value thereof be large, and that the absolute value of the second derivative $\beta_2$ be large. Also, the bending loss of optical fibers for light pulse expansion is preferably small, since the optical fiber is normally used as a module in a coiled form. At the 1-μm wavelength band (1.0 μm to 1.1 μm), which is not normally used for optical communication, measuring instruments are usually not conventional, which makes measurement of the dispersion characteristic difficult; in light pulse-expanding optical fibers for expanding light pulses in the 1 μm wavelength band, therefore, feedback through characteristic measurement becomes difficult during fiber manufacture, and hence it is desirable that the change of the ratio ($\beta_3/\beta_2$) is smaller with the outer diameter fluctuation of the core portion.

In order to solve the above-described problems, it is an object of the invention to provide an optical fiber for light pulse expansion in which the ratio ($\beta_3/\beta_2$) of the third derivative $\beta_3$ to the second derivative $\beta_2$ is negative, the absolute value thereof is large, and in which the absolute value of the second derivative $\beta_2$ is also large.

Means for Solving the Problems

The optical fiber according to the present invention comprises at least a central core portion having a maximum refractive index $N_1$ and an outer diameter $2a$, a depressed portion, provided on the outer periphery of the central core portion, having a minimum refractive index $N_2$ and an outer diameter $2b$, and a cladding portion, surrounding the outer periphery of the depressed portion and having a maximum refractive index $N_3$. In particular, the respective maximum refractive indices of the central core portion, the depressed portion and the cladding portion in the optical fiber according to the present invention satisfy the relationship "$N_1 > N_3 > N_2$". The relative refractive index difference $\Delta_1$ of the central core portion with respect to the cladding portion is larger than 1.0%, and the relative refractive index difference $\Delta_2$ of the depressed portion with respect to the cladding portion is smaller than $-0.3\%$. At the wavelength of 1.05 μm, the second derivative $\beta_2$ of the propagation constant $\beta$ with respect to frequency $\omega$ is positive, the third derivative $\beta_3$ of the propagation constant $\beta$ with respect to frequency $\omega$ is negative, and the ratio ($\beta_3/\beta_2$) of the third derivative $\beta_3$ to the second derivative $\beta_2$ is $-0.002$ ps or less. In the optical fiber having such a profile, the absolute value of the ratio ($\beta_3/\beta_2$) of the third derivative $\beta_3$ to the second derivative $\beta_2$ at the wavelength of 1.05 µm, having a negative sign, can be made yet larger, and also the absolute value of the second derivative $\beta_2$ can be made yet larger.

In the optical fiber according to the present invention, the ratio $Ra(=2a/2b)$ of the outer diameter $2a$ of the central core portion to the outer diameter $2b$ of the depressed portion is preferably 0.2 or more but less than 0.6, the ratio $Ra(=2a/2b)$ is more preferably 0.3 or more. The relative refractive index difference $\Delta_1$ of the central core portion with respect to the cladding portion is preferably 1.7% or more. The relative refractive index difference $\Delta_2$ of the depressed portion with respect to the cladding portion is preferably −0.5% or less. The outer diameter $2a$ of the central core portion is preferably 1.4 µm or more but 4.0 µm or less. The ratio $(\beta_3/\beta_2)$ at the wavelength of 1.05 µm is preferably −0.003 ps or less.

In the optical fiber according to the present invention, the bending loss at the wavelength of 1.05 µm is 100 dB/m or less in the condition of being wound in the diameter of 40 mm, preferably 1 dB/m or less, and yet more preferably 0.001 dB/m or less. In these cases the loss increase arising from the optical fiber being coiled to a small diameter is effectively reduced.

The optical fiber according to the present invention may further comprise a ring portion provided between the depressed portion and the cladding portion. The ring portion has a maximum refractive index $N_4$ and an outer diameter $2c$. The respective maximum refractive indices of the central core portion, the depressed portion, the ring portion and the cladding portion satisfy preferably the following relationship:

$N_1 > N_4 > N_3 > N_2$

The optical fiber coil according to the present invention is obtained by winding into a coil shape the optical fiber having the above-described structure (the optical fiber according to the present invention); herein, the minimum wound diameter of the optical fiber is preferably 120 mm or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Advantage of the Invention

In accordance with the optical fiber according to the present invention, since the ratio $(\beta_3/\beta_2)$ of the third derivative $\beta_3$ to the second derivative $\beta_2$ is negative and an absolute value thereof becomes large, and an absolute value of the second derivative $\beta_2$ also becomes large, the effective light pulse expansion can be achieved in a short fiber length.

BRIEF DESCRIPTION OF THE DRAWINGS

FIG. 12 is a table summarizing the characteristics of plural samples of the optical fiber according to the first embodiment;

FIG. 17 shows diagrams showing the constitution of an embodiment of an optical fiber coil according to the present invention;

DESCRIPTION OF THE REFERENCE NUMERALS

Figure 1:
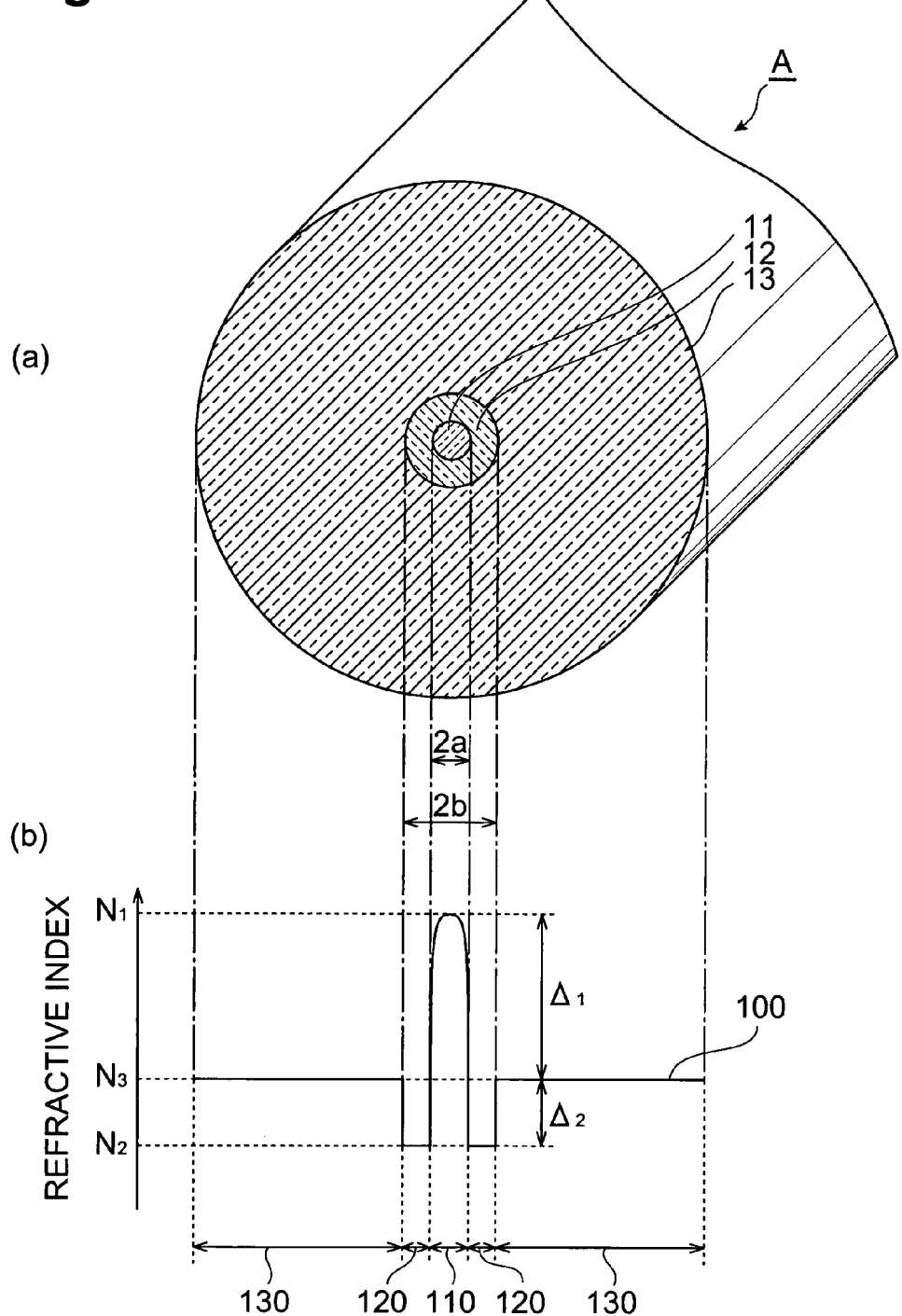
FIG. 1 shows a cross sectional structure of a first embodiment of an optical fiber according to the present invention, and a refractive index profile thereof.

A ... optical fiber; 11, 41 ... central core portion; 12, 42 ... depressed portion; 13, 43 ... cladding portion; and 44 ... ring portion.

BEST MODES FOR CARRYING OUT THE INVENTION

In the following, embodiments of the optical fiber and optical fiber coil according to the present invention will be explained in detail with reference to FIGS. 1 to 22. In the description of the drawings, identical or corresponding components are designated by the same reference numerals, and overlapping description is omitted.

First Embodiment

Figure 2:
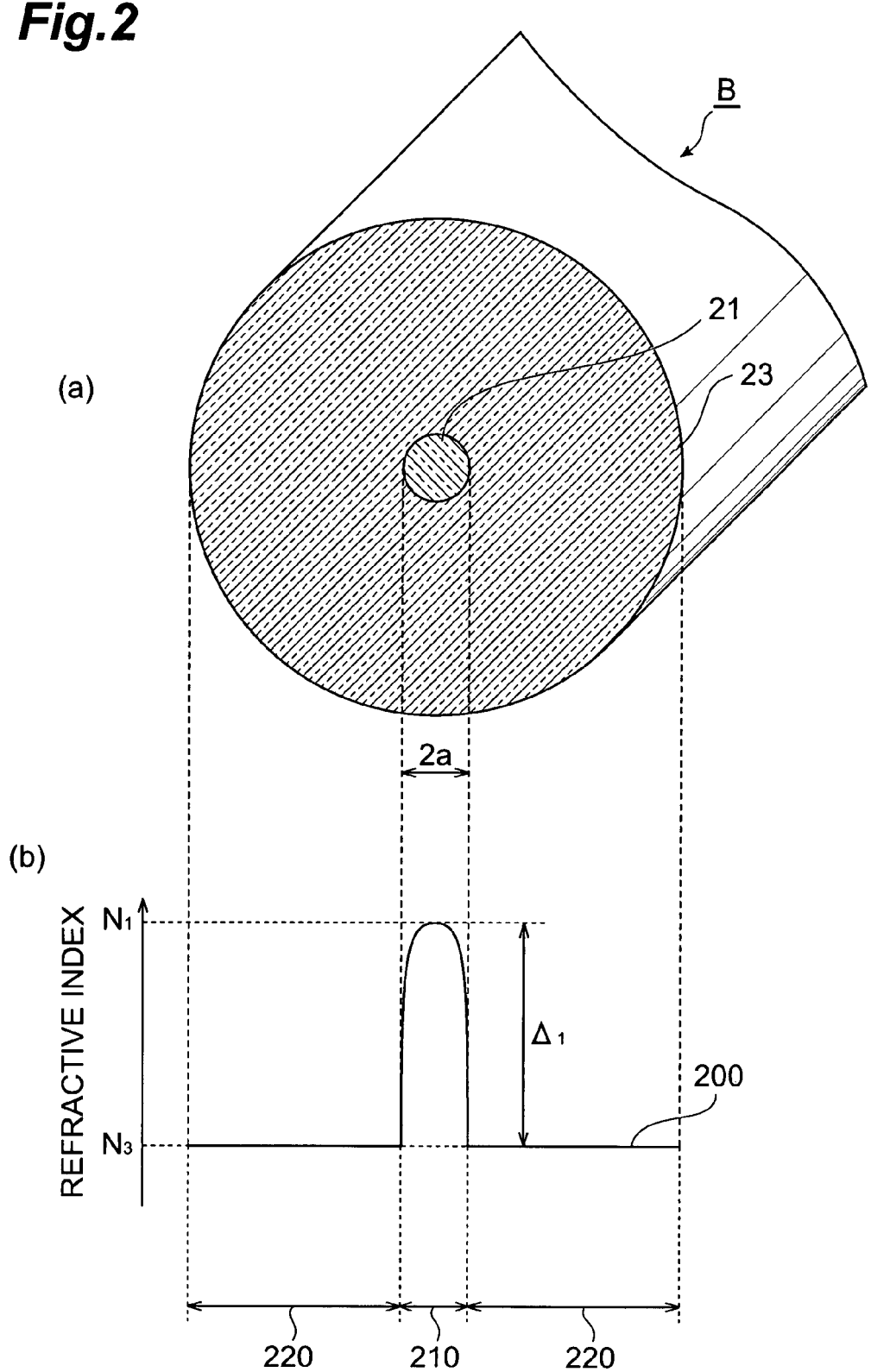
FIG. 2 shows a cross sectional structure of an optical fiber according to a comparative example, and a refractive index profile thereof.

A first embodiment of the optical fiber according to the present invention will be explained first in the comparison with respect to an optical fiber according to a comparative example. FIG. 1 shows the structure of an optical fiber A according to the first embodiment; the area (a) shows a cross sectional structure of the optical fiber A according to the first embodiment, while the area (b) shows the refractive index profile thereof. FIG. 2 shows an optical fiber B according to a comparative example; the area (a) shows a cross sectional structure of the optical fiber B according to the comparative example, while the area (b) shows the refractive index profile thereof.

As shown in the area (a) of FIG. 1, the optical fiber A according to the first embodiment comprises: a central core portion 11 having a maximum refractive index $N_1$ and an outer diameter $2a$; a depressed portion 12, provided on the outer periphery of the central core portion 11, having a minimum refractive index $N_2$ and an outer diameter $2b$; and a cladding portion 13, provided on the outer periphery of the depressed portion 12, having a maximum refractive index $N_3$. The refractive indices of the central core portion 11, the depressed portion 12 and the cladding portion 13 satisfy the following formula (5):

[Formula 5]

$$N_1 > N_3 > N_2 \quad (5)$$

The area (b) of FIG. 1 shows a refractive index profile 100 of the optical fiber A according to the first embodiment. In this refractive index 100, a region 110 denotes the refractive index in the radial direction of the central core portion 11, the region 120 denotes the refractive index in the radial direction of the depressed portion 12, and the region 130 denotes the refractive index in the radial direction of the cladding portion 13.

In the optical fiber A according to the first embodiment, the relative refractive index difference $\Delta_1$ of the central core portion 11 with respect to the cladding portion 13 is defined by the following formula (6), and is higher than 1.0%. The relative refractive index difference $\Delta_2$ of the depressed portion 12 with respect to the cladding portion 13 is defined by the following formula (7), and is smaller than −0.3%. At a wavelength of 1.05 μm, the second derivative $\beta_2$ of the propagation constant $\beta$ with respect to frequency $\omega$ is positive, the third derivative $\beta_3$ of the propagation constant $\beta$ with respect to frequency $\omega$ is negative, and the ratio ($\beta_3/\beta_2$) of the third derivative $\beta_3$ to the second derivative $\beta_2$ is −0.002 ps or less.

[Formula 6]

$$\Delta_1 = 100 \cdot \frac{N_1 - N_3}{N_3} (\%) \quad (6)$$

[Formula 7]

$$\Delta_2 = 100 \cdot \frac{N_2 - N_3}{N_3} (\%) \quad (7)$$

As shown in the area (a) of FIG. 2, the optical fiber B according to the comparative example comprises: a central core portion 21 having a maximum refractive index $N_1$ and an outer diameter $2a$; and a cladding portion 23, provided on the outer periphery of the central core portion 21, having a refractive index $N_3$. Although the optical fiber B according to the comparative example has a matched-type refractive index profile, as shown in the area (b) of FIG. 2, it lacks a depressed portion.

As shown in the area (b) of FIG. 2, a region 210 in a refractive index profile 200 of the optical fiber B according to the comparative example represents the refractive index of the central core portion 21 in the radial direction, and a region 220 represents the refractive index of the cladding portion 23 in the radial direction.

Figure 3:
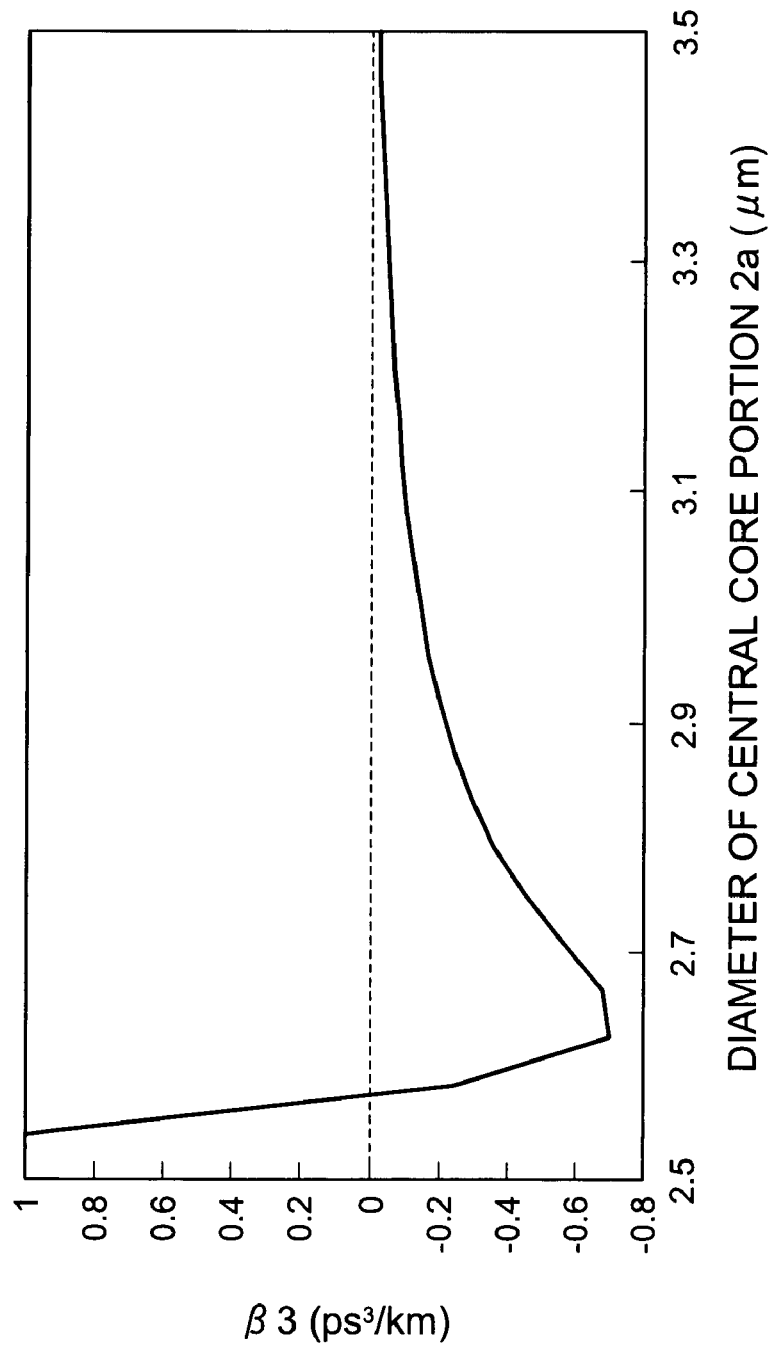
FIG. 3 is a graph showing the relationship between the outer diameter $2a$ of a central core portion and the third derivative $\beta_3$ at a wavelength of 1.05 µm in the optical fiber according to the first embodiment.
Figure 4:
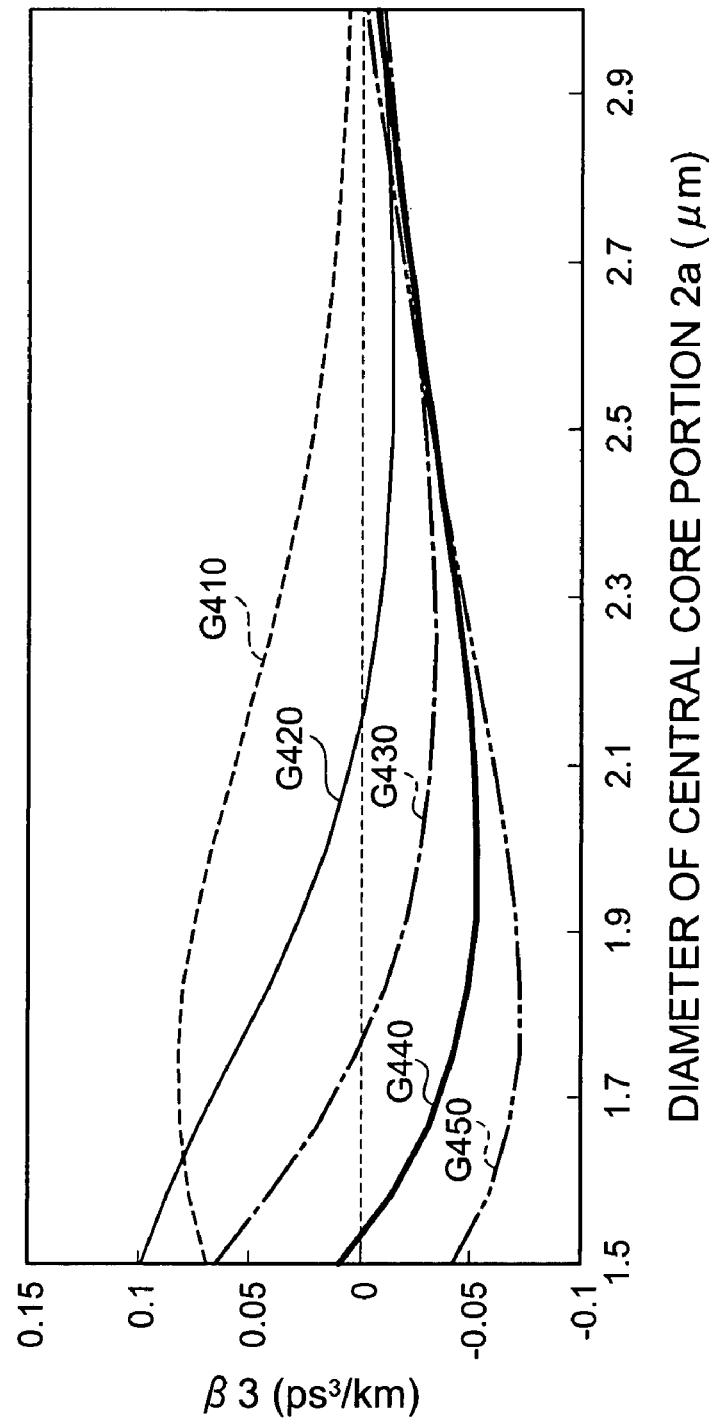
FIG. 4 is a graph showing the relationship between the outer diameter $2a$ of the central core portion and the third derivative $\beta_3$ at the wavelength of 1.05 µm in the optical fiber according to the comparative example.

FIG. 3 is a graph showing the relationship between the outer diameter $2a$ of the central core portion 11 and the third derivative $\beta_3$ at the wavelength of 1.05 μm in the optical fiber A according to the first embodiment. For the measurement of the graph shown in FIG. 3, a sample of the optical fiber A was prepared setting the relative refractive index difference $\Delta_1$ of the central core portion 11 with respect to the cladding portion 13 to 1.0%, the relative refractive index difference $\Delta_2$ of the depressed portion 12 with respect to the cladding portion 13 to −0.3%, and the ratio Ra(=2a/2b) of the respective outer diameters of the central core portion 11 and the depressed portion 12 to 0.4. FIG. 4 is a graph showing the relationship between the outer diameter 2a of the central core portion 21 and the third derivative $\beta_3$ at the wavelength of 1.05 μm in the optical fiber B according to the comparative example. For the measurement of the graph shown in FIG. 4, samples of the optical fiber B were prepared setting the relative refractive index difference $\Delta_1$ of the central core portion 21 with respect to the cladding portion 23 to 1.0%, 1.5%, 2.0%, 2.5% and 3.0%, respectively. In FIG. 4, the graph G410 indicates measurement results for a sample of the optical fiber B in which the relative refractive index difference $\Delta_1$ of the central core portion 21 is set to 1.0%, the graph G420 indicates those for a sample of the optical fiber B in which the relative refractive index difference $\Delta_1$ of the central core portion 21 is set to 1.5%, the graph G430 indicates those for a sample of the optical fiber B in which the relative refractive index difference $\Delta_1$ of the central core portion 21 is set to 2.0%, the graph G440 indicates those for a sample of the optical fiber B in which the relative refractive index difference $\Delta_1$ of the central core portion 21 is set to 2.5%, the graph G450 indicates those for a sample of the optical fiber B in which the relative refractive index difference $\Delta_1$ of the central core portion 21 is set to 3.0%.

As shown in FIG. 4, regarding the optical fiber B according to the comparative example, the third derivative $\beta_3$ does not become negative when the relative refractive index difference $\Delta_1$ of the central core portion 21 is 1.0%. On the other hand, the third derivative $\beta_3$ can become negative when the relative refractive index difference $\Delta_1$ of the central core portion 21 is 1.5% or more. A negative number of the third derivative $\beta_3$ requires the relative refractive index difference $\Delta_1$ of the central core portion 21 larger than 1.5%, but the absolute value of the third derivative $\beta_3$ is limited to smaller. In contrast, as shown in FIG. 3, the third derivative $\beta_3$ in the optical fiber A according to the first embodiment is negative even when the relative refractive index difference $\Delta_1$ of the central core portion 11 is 1.0%, while, in addition, the absolute value of the third derivative $\beta_3$ can be made an order of magnitude larger than that of the comparative example. In the optical fiber A according to the first embodiment, therefore, the third derivative $\beta_3$ at the 1 μm wavelength band (1.0 μm to 1.1 μm) can be easily made negative, which is the reverse sign of that of the optical fiber B according to the comparative example.

Next, the relationship between the ratio Ra(=2a/2b) of the respective outer diameters of the central core portion 11 and the depressed portion 12 in the optical fiber A according to the first embodiment, and the ratio ($\beta_3/\beta_2$) of the third derivative $\beta_3$ to the second derivative $\beta_2$ at the wavelength of 1.05 μm will be explained.

Figure 5:
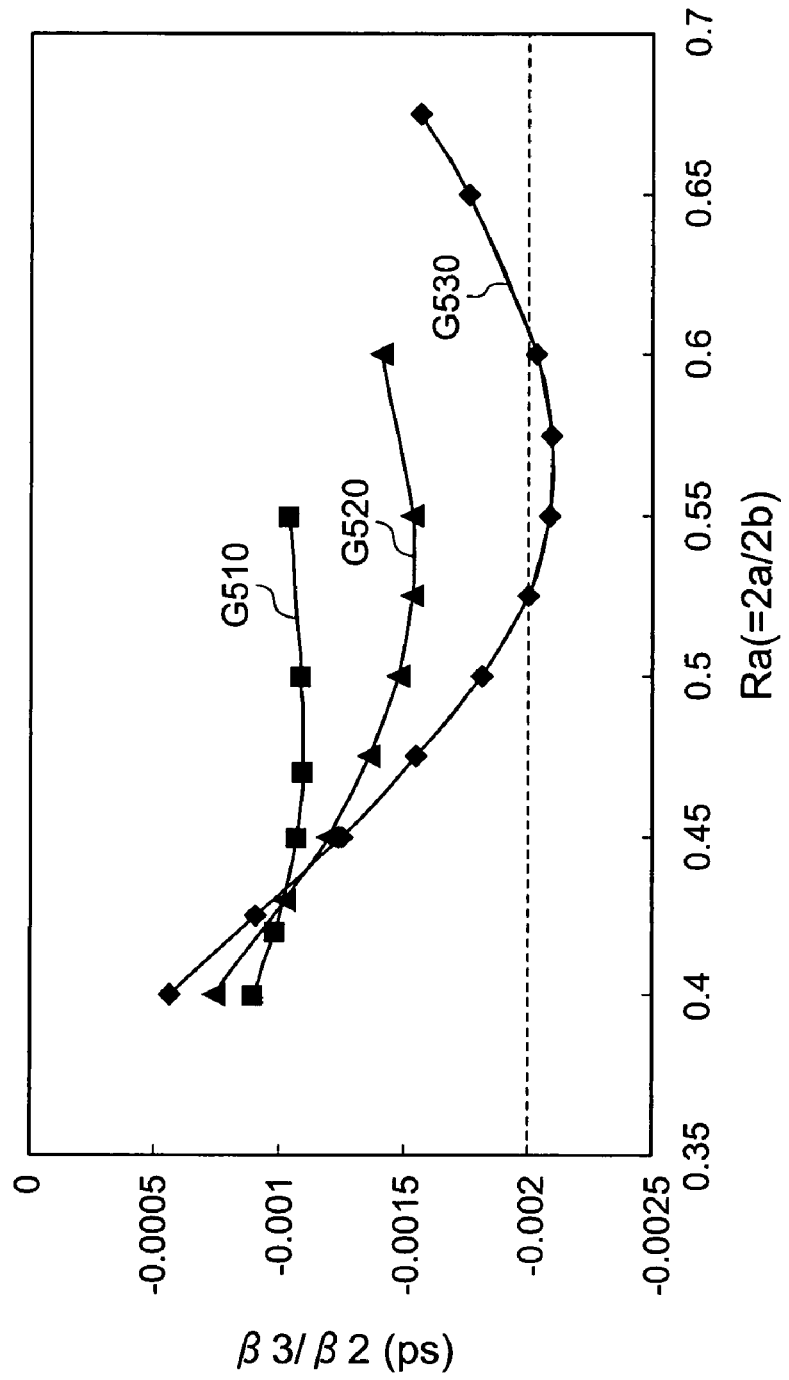
FIG. 5 is a graph showing the relationship between the ratio $Ra(=2a/2b)$ and the ratio $(\beta_3/\beta_2)$ in the optical fiber according to the first embodiment when changing the relative refractive index difference $\Delta_2$ of the depressed portion with respect to the cladding portion and the outer diameter $2a$ of the central core portion while the relative refractive index difference $\Delta_1$ of the central core portion with respect to the cladding portion is fixed (Part 1)
Figure 6:
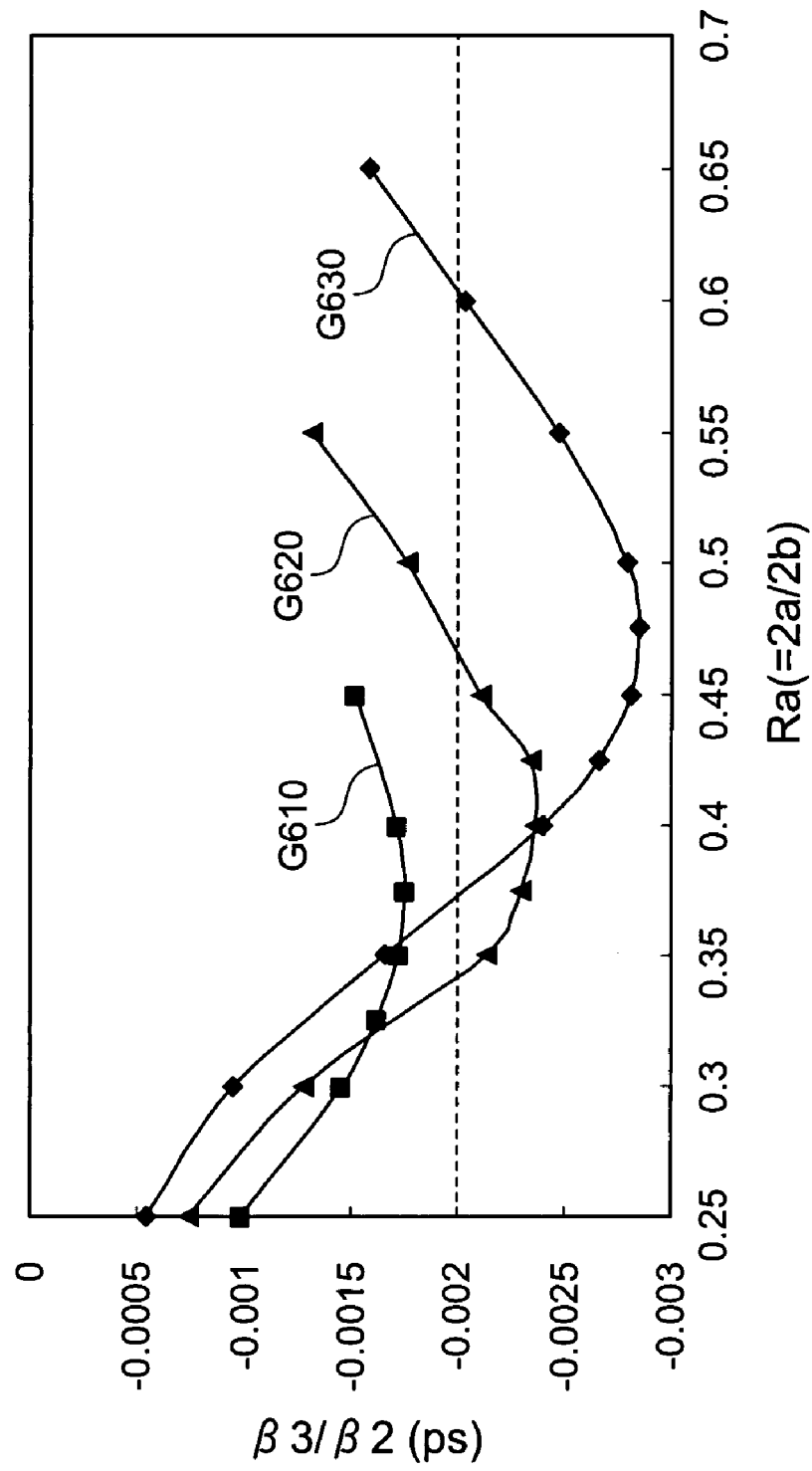
FIG. 6 is a graph showing the relationship between the ratio Ra and the ratio $(\beta_3/\beta_2)$ in the optical fiber according to the first embodiment when changing the relative refractive index difference $\Delta_2$ of the depressed portion with respect to the cladding portion and the outer diameter $2a$ of the central core portion while the relative refractive index difference $\Delta_1$ of the central core portion with respect to the cladding portion is fixed (Part 2)
Figure 7:
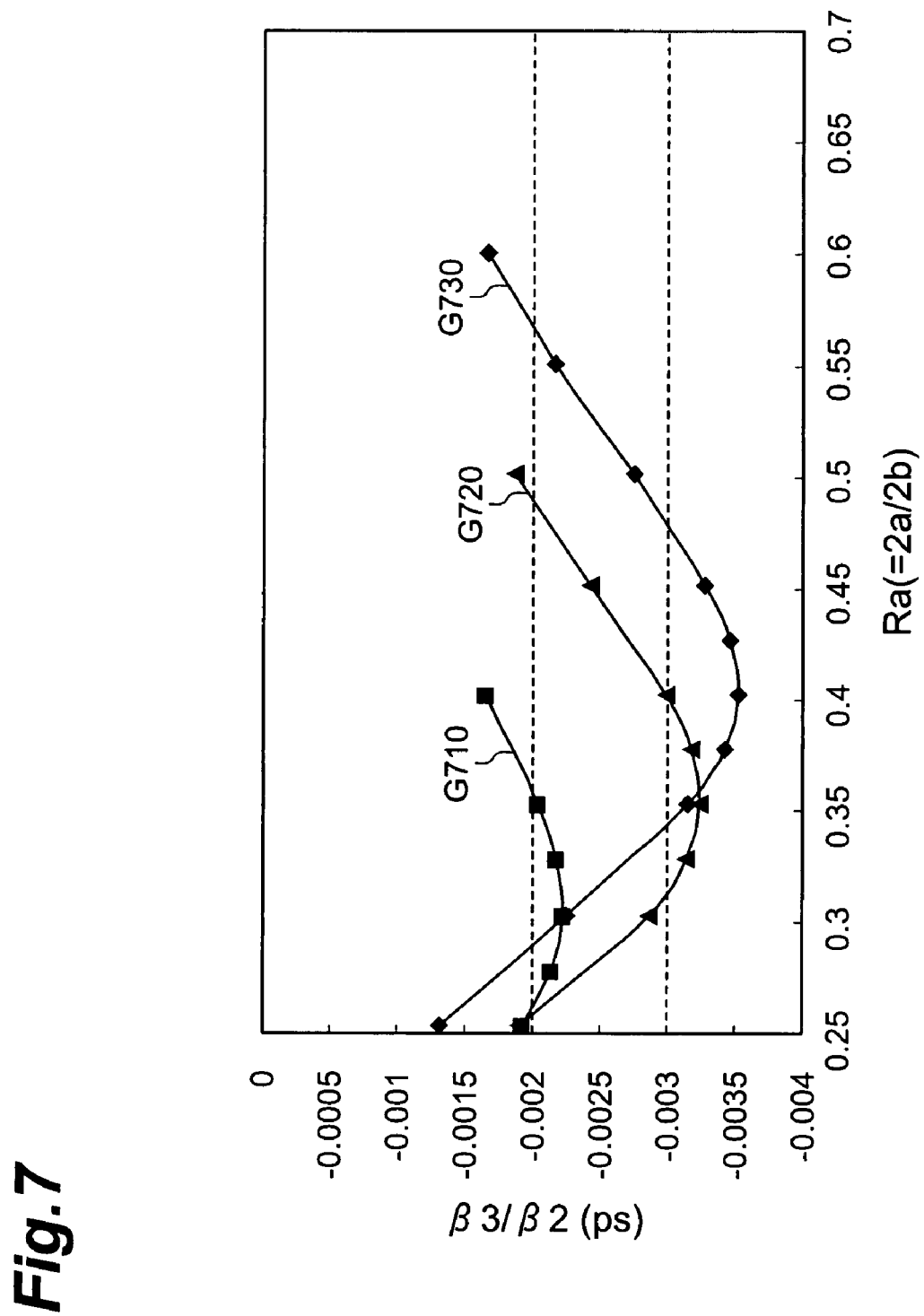
FIG. 7 is a graph showing the relationship between the ratio Ra and the ratio $(\beta_3/\beta_2)$ in the optical fiber according to the first embodiment when changing the relative refractive index difference $\Delta_2$ of the depressed portion with respect to the cladding portion and the outer diameter $2a$ of the central core portion while the relative refractive index difference $\Delta_1$ of the central core portion with respect to the cladding portion is fixed (Part 3)
Figure 8:
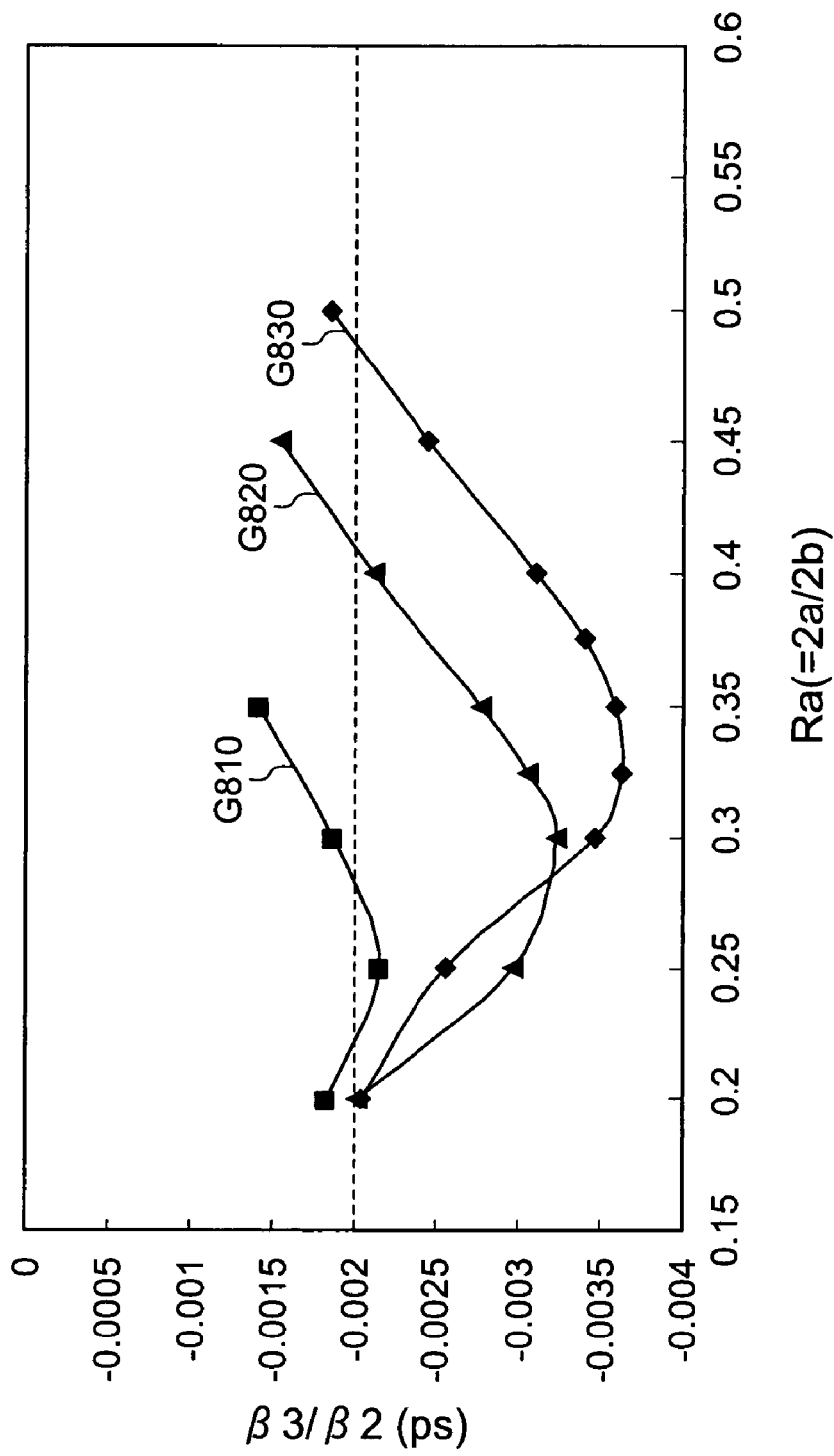
FIG. 8 is a graph showing the relationship between the ratio Ra and the ratio $(\beta_3/\beta_2)$ in the optical fiber according to the first embodiment when changing the relative refractive index difference $\Delta_2$ of the depressed portion with respect to the cladding portion and the outer diameter $2a$ of the central core portion while the relative refractive index difference $\Delta_1$ of the central core portion with respect to the cladding portion is fixed (Part 4)

FIGS. 5 to 8 are graphs showing, respectively, the relationship between the ratio Ra(=2a/2b) and the ratio ($\beta_3/\beta_2$) in the optical fiber A according to the first embodiment when changing the relative refractive index difference $\Delta_2$ of the depressed portion 12 with respect to the cladding portion 13 and the outer diameter 2a of the central core portion while the relative refractive index difference $\Delta_1$ of the central core portion 11 with respect to the cladding portion 13 is fixed. In particular, the graph depicted in FIG. 5 shows measurement results when the relative refractive index difference $\Delta_1$ of the central core portion 11 is fixed to 1.0%, the graph depicted in FIG. 6 shows measurement results when the relative refractive index difference $\Delta_1$ of the central core portion 11 is fixed to 1.5%, the graph depicted in FIG. 7 shows measurement results when the relative refractive index difference $\Delta_1$ of the central core portion 11 is fixed to 2.0%, while the graph depicted in FIG. 8 shows measurement results when the relative refractive index difference $\Delta_1$ of the central core portion 11 is fixed to 3.0%.

FIGS. 5 to 8 shows three combinations of relative refractive index difference $\Delta_2$ of the depressed portion 12 and outer diameter 2a of the central core portion 11. In terms of small-size coiling of the optical fiber A, the bending loss of the optical fiber A when being wound to a diameter of 40 mm is set to be of about 0.001 dB/m (a bending loss of a 100 m long optical fiber A in the 40-mm diameter wound condition is 0.1 dB) for the wavelength of 1.05 μm.

In FIG. 5, specifically, the graph G510 indicates measurement results when the relative refractive index difference $\Delta_2$ of the depressed portion 12 is −0.3% and the outer diameter 2a of the central core portion 11 is 3.13 μm, the graph G520 indicates measurement results when the relative refractive index difference $\Delta_2$ of the depressed portion 12 is −0.5% and the outer diameter 2a of the central core portion 11 is 3.42 μm, and the graph G530 indicates measurement results when the relative refractive index difference $\Delta_2$ of the depressed portion 12 is −0.7% and the outer diameter 2a of the central core portion 11 is 3.46 μm. In FIG. 6, the graph G610 indicates measurement results when the relative refractive index difference $\Delta_2$ of the depressed portion 12 is −0.3% and the outer diameter 2a of the central core portion 11 is 2.42 μm, the graph G620 indicates measurement results when the relative refractive index difference $\Delta_2$ of the depressed portion 12 is −0.5% and the outer diameter 2a of the central core portion 11 is 2.54 μm, and the graph G630 indicates measurement results when the relative refractive index difference $\Delta_2$ of the depressed portion 12 is −0.7% and the outer diameter 2a of the central core portion 11 is 2.63 μm. In FIG. 7, the graph G710 indicates measurement results when the relative refractive index difference $\Delta_2$ of the depressed portion 12 is −0.3% and the outer diameter 2a of the central core portion 11 is 1.93 μm, the graph G720 indicates measurement results when the relative refractive index difference $\Delta_2$ of the depressed portion 12 is −0.5% and the outer diameter 2a of the central core portion 11 is 2.03 μm, and the graph G730 indicates measurement results when the relative refractive index difference $\Delta_2$ of the depressed portion 12 is −0.7% and the outer diameter 2a of the central core portion 11 is 2.13 μm. In FIG. 8, the graph G810 indicates measurement results when the relative refractive index difference $\Delta_2$ of the depressed portion 12 is −0.3% and the outer diameter 2a of the central core portion 11 is 1.47 μm, the graph G820 indicates measurement results when the relative refractive index difference $\Delta_2$ of the depressed portion 12 is −0.5% and the outer diameter 2a of the central core portion 11 is 1.55 μm, and the graph G830 indicates measurement results when the relative refractive index difference $\Delta_2$ of the depressed portion 12 is −0.7% and the outer diameter 2a of the central core portion 11 is 1.57 μm.

As can be seen from FIGS. 5 to 8, a ratio ($\beta_3/\beta_2$) of the third derivative $\beta_3$ to the second derivative $\beta_2$ at the wavelength of 1.05 μm can be −0.002 ps or less, and even be −0.003 ps or less. As shown in FIG. 5, the ratio ($\beta_3/\beta_2$) becomes −0.002 ps or less when the ratio Ra falls within the range of 0.52 to 0.60, in the sample of the optical fiber A in which the relative refractive index difference $\Delta_1$ of the central core portion 11 is 1.0%, the relative refractive index difference $\Delta_2$ of the depressed portion 12 is −0.7% and the outer diameter 2a of the central core portion 11 is 3.5 μm.

As shown in FIG. 6, the optical fiber A samples in which the relative refractive index difference $\Delta_1$ of the central core portion 11 is 1.5% have slightly smaller ratios $(\beta_3/\beta_2)$. The ratio $(\beta_3/\beta_2)$ becomes −0.002 ps or less in the condition that a ratio Ra falls within the range of 0.34 to 0.46, in the optical fiber A sample in which the relative refractive index difference $\Delta_2$ of the depressed portion 12 is −0.5% and the outer diameter $2a$ of the central core portion 11 is 2.5 μm. The ratio $(\beta_3/\beta_2)$ becomes −0.002 ps or less in the condition that a ratio Ra falls within the range of 0.37 to 0.60, in the optical fiber A sample in which the relative refractive index difference $\Delta_2$ of the depressed portion 12 is −0.7% and the outer diameter $2a$ of the central core portion 11 is 2.6 μm.

As shown in FIG. 7, the optical fiber A samples in which the relative refractive index difference $\Delta_1$ of the central core portion 11 is 2.0% have considerably smaller ratios $(\beta_3/\beta_2)$. The ratio $(\beta_3/\beta_2)$ becomes −0.002 ps or less in the condition that the ratio Ra falls within the range of 0.25 to 0.35, in the optical fiber A sample in which the relative refractive index difference $\Delta_2$ of the depressed portion 12 is −0.3% and the outer diameter $2a$ of the central core portion 11 is 1.9 μm. The ratio $(\beta_3/\beta_2)$ becomes −0.002 ps or less in the condition that the ratio Ra falls within the range of 0.25 to 0.48, in the optical fiber A sample in which the relative refractive index difference $\Delta_2$ of the depressed portion 12 is −0.5% and the outer diameter $2a$ of the central core portion 11 is 2.0 μm. Also, the ratio $(\beta_3/\beta_2)$ becomes −0.002 ps or less in the condition that the ratio Ra falls within the range of 0.28 to 0.57, in the optical fiber A sample in which the relative refractive index difference $\Delta_2$ of the depressed portion 12 is −0.7% and the outer diameter $2a$ of the central core portion 11 is 2.1 μm. Herein can be reached a ratio $(\beta_3/\beta_2)$ as low as about −0.0035 ps.

As shown in FIG. 8, the optical fiber A samples in which the relative refractive index difference $\Delta_1$ of the central core portion 11 is 3.0% have even smaller ratios $(\beta_3/\beta_2)$. The ratio $(\beta_3/\beta_2)$ becomes −0.002 ps or less in the condition that the ratio Ra falls within the range of 0.23 to 0.33, in the optical fiber A sample in which the relative refractive index difference $\Delta_2$ of the depressed portion 12 is −0.3% and the outer diameter $2a$ of the central core portion 11 is 1.5 μm. The ratio $(\beta_3/\beta_2)$ becomes −0.002 ps or less in the condition that the ratio Ra falls within the range of 0.20 to 0.41, in the optical fiber A sample in which the relative refractive index difference $\Delta_2$ of the depressed portion 12 is −0.5% and the outer diameter $2a$ of the central core portion 11 is 1.6 μm. Also, the ratio $(\beta_3/\beta_2)$ becomes −0.002 ps or less in the condition that the ratio Ra falls within the range of 0.20 to 0.48, in the optical fiber A sample in which the relative refractive index difference $\Delta_2$ of the depressed portion 12 is −0.7% and the outer diameter $2a$ of the central core portion 11 is 1.6 μm.

Thus, the ratio $(\beta_3/\beta_2)$ becomes −0.002 ps or less when the relative refractive index difference $\Delta_1$ of the central core portion 11 is high, when the relative refractive index difference $\Delta_2$ of the depressed portion 12 is low, and further when the ratio Ra falls within a predetermined suitable range (in essence, when the range of the ratio Ra is from 0.2 to 0.6). The ratio $(\beta_3/\beta_2)$ becomes ideally −0.002 ps or less when the relative refractive index difference $\Delta_1$ of the central core portion 11 is of at least 1.0%, with an easily realizable relative refractive index difference $\Delta_2$ of the depressed portion 12 of −0.7% or more. The ratio $(\beta_3/\beta_2)$ becomes ideally −0.002 ps or less when the relative refractive index difference $\Delta_2$ of the depressed portion 12 of −0.3% or less. In particular, the ratio $(\beta_3/\beta_2)$ becomes clearly smaller when the relative refractive index difference $\Delta_2$ of the depressed portion 12 is −0.5% or less, which is yet more preferable.

Although the ratio Ra preferably falls within the range of 0.2 to 0.6, a small ratio Ra is problematic in that the change of the ratio $(\beta_3/\beta_2)$ relative to the change of the core diameter becomes large. In particular, the 1.0 μm wavelength band is not normally used for optical communication systems, and hence measurement of dispersion characteristics is difficult since there are few instruments for the measurement at such a wavelength band. Thus, for instance, when changing the outer diameter $2a$ of the central core portion 11, with the relative refractive index difference $\Delta_1$ of the central core portion 11 with respect to the cladding portion fixed to 2.0%, a smaller change of the ratio $(\beta_3/\beta_2)$ enables fiber manufacturing with a high yield, even though with some additional disturbance.

Figure 9:
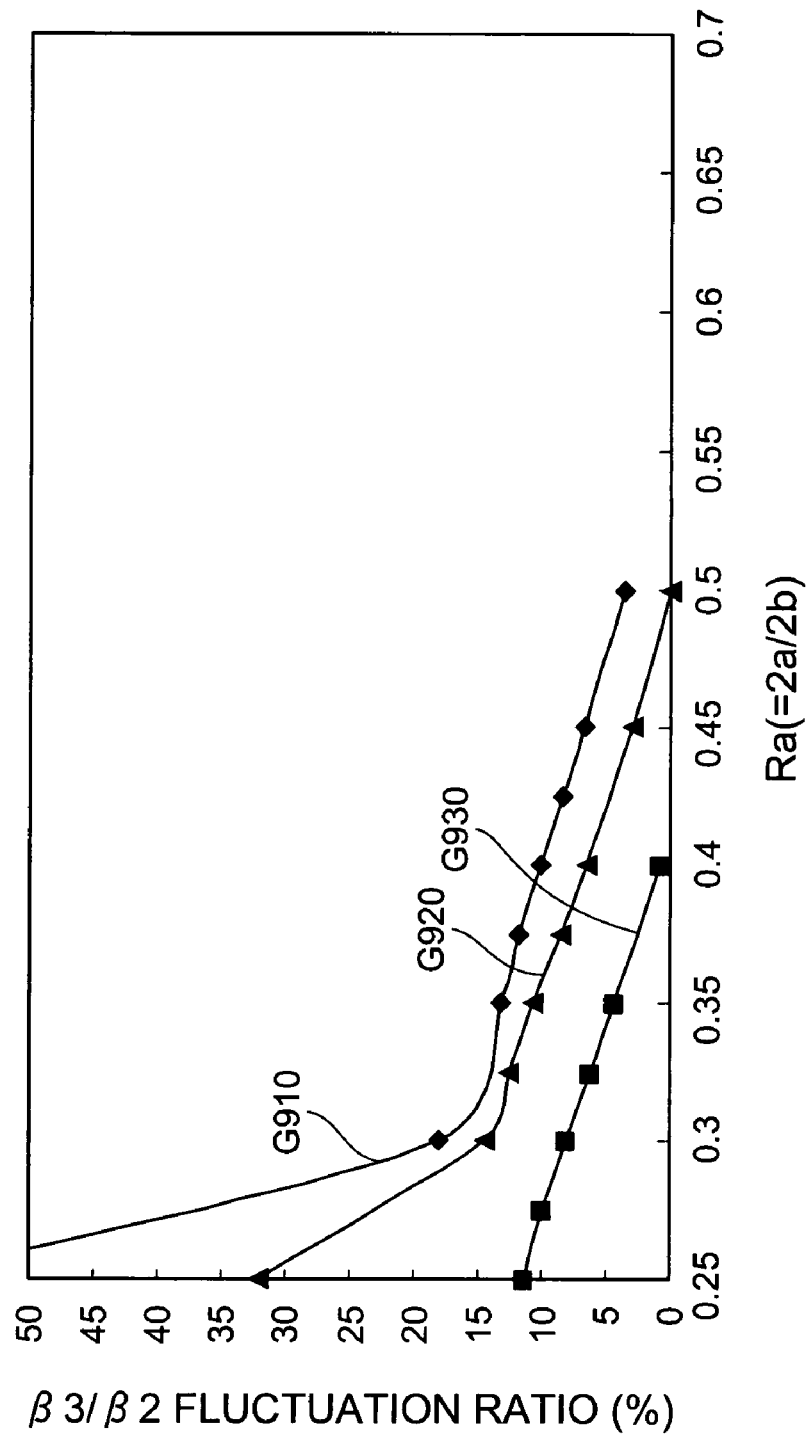
FIG. 9 is a graph showing the relationship between the rates of change of the ratio Ra and the ratio $(\beta_3/\beta_2)$ in the optical fiber according to the first embodiment when changing the relative refractive index difference $\Delta_2$ of the depressed portion with respect to the cladding portion and the outer diameter $2a$ of the central core portion while the relative refractive index difference $\Delta_1$ of the central core portion with respect to the cladding portion is fixed.

FIG. 9 is a graph showing the relationship between the rates of change of the ratio Ra($=2a/2b$) and the ratio $(\beta_3/\beta_2)$ when the relative refractive index difference $\Delta_2$ of the depressed portion 12 with respect to the cladding portion 13 is changed in the optical fiber A according to the first embodiment, with the relative refractive index difference $\Delta_1$ of the central core portion 11 fixed to 2.0%. In FIG. 9, the graph G910 indicates measurement results when the relative refractive index difference $\Delta_2$ of the depressed portion 12 is −0.7%, the graph G920 indicates measurement results when the relative refractive index difference $\Delta_2$ of the depressed portion 12 is −0.5%, and the graph G930 indicates measurement results when the relative refractive index difference $\Delta_2$ of the depressed portion 12 is −0.3%.

As can be seen from FIG. 9, the rate of change of the ratio $(\beta_3/\beta_2)$ becomes 15% or less when the ratio Ra is 0.3 or more, so that an optical fiber A having a desired ratio $(\beta_3/\beta_2)$ can be fabricated with high yield.

Figure 10:
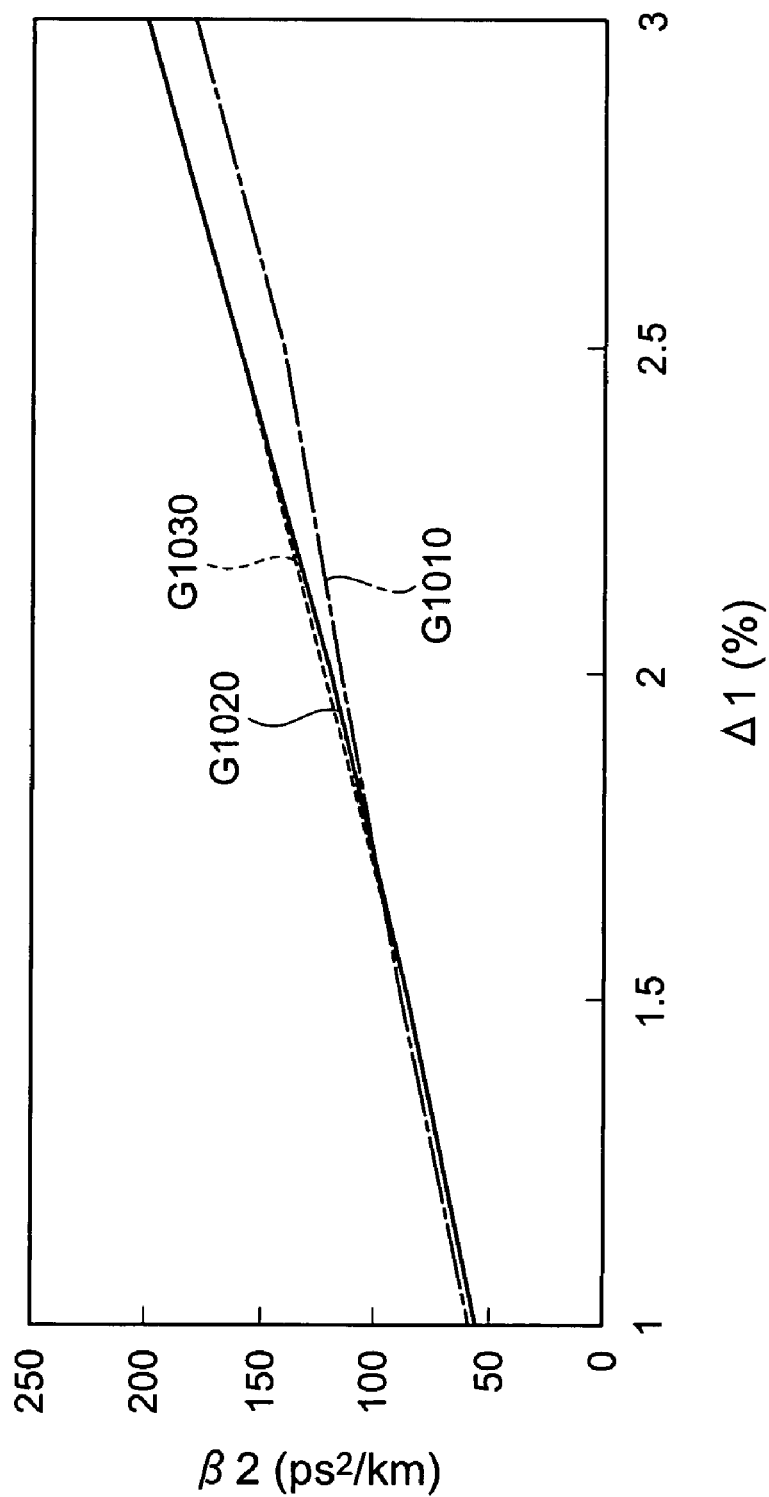
FIG. 10 is a graph showing the relationship between the second derivative $\beta_2$ and the relative refractive index difference $\Delta_1$ of the central core portion with respect to the cladding portion in the optical fiber according to the first embodiment when the relative refractive index difference $\Delta_2$ of the depressed portion with respect to the cladding portion is changed.
Figure 11:
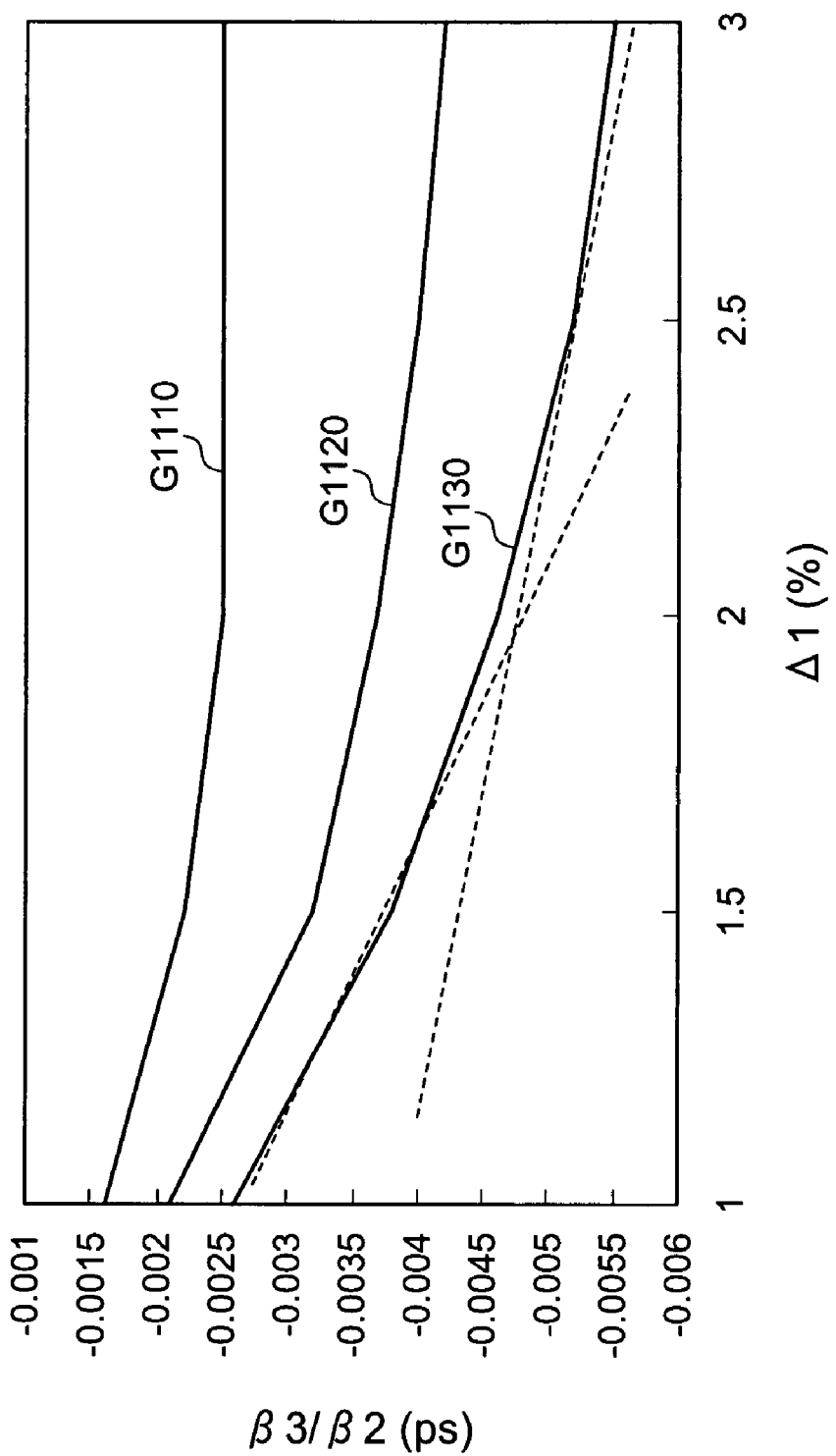
FIG. 11 is a graph showing the relationship between the ratio $(\beta_3/\beta_2)$ and the relative refractive index difference $\Delta_1$ of the central core portion with respect to the cladding portion in the optical fiber according to the first embodiment when the relative refractive index difference $\Delta_2$ of the depressed portion with respect to the cladding portion is changed.

In the condition that the relative refractive index difference $\Delta_1$ of the central core portion 11 and the relative refractive index difference $\Delta_2$ of the depressed portion 12 both fixed to constant values, changing the ratio Ra($=2a/2b$) yields a minimum ratio $(\beta_3/\beta_2)$ for a certain value of Ra, as shown in FIGS. 5 to 8. FIG. 10 is a graph showing the relationship between the second derivative $\beta_2$ and the relative refractive index difference $\Delta_1$ of the central core portion 11 with respect to the cladding portion 13 when the relative refractive index difference $\Delta_2$ of the depressed portion 12 with respect to the cladding portion 13 is changed, in the optical fiber A according to the first embodiment. In FIG. 10, the graph G1010 indicates measurement results when the relative refractive index difference $\Delta_2$ of the depressed portion 12 is −0.30%, the graph G1020 indicates measurement results when the relative refractive index difference $\Delta_2$ of the depressed portion 12 is −0.50%, and the graph G1030 indicates measurement results when the relative refractive index difference $\Delta_2$ of the depressed portion 12 is −0.70%. FIG. 11 is a graph showing the relationship between the ratio $(\beta_3/\beta_2)$ and the relative refractive index difference $\Delta_1$ of the central core portion 11 with respect to the cladding portion 13 when the relative refractive index difference $\Delta_2$ of the depressed portion 12 with respect to the cladding portion 13 is changed in the optical fiber A according to the first embodiment. In FIG. 11, the graph G1110 indicates measurement results when the relative refractive index difference $\Delta_2$ of the depressed portion 12 is −0.30%, the graph G1120 indicates measurement results when the relative refractive index difference $\Delta_2$ of the depressed portion 12 is −0.50%, and the graph G1130 indicates measurement results when the relative refractive index difference $\Delta_2$ of the depressed portion 12 is −0.70%. In the samples of the optical fiber A prepared for the measurements shown in FIGS. 10 and 11, the ratio Ra($=2a/2b$) is selected so as to yield a minimum ratio $(\beta_3/\beta_2)$. The ratio is set also so as to yield a bending loss of 0.001 dB/km in a 60-mm diameter wound condition (corresponding to loss increase of 0.1 dB when a 100 m long optical fiber is wound in a diameter of 60 mm, bending loss of 0.1 to 1 dB/m in a 40-mm diameter wound condition).

The larger the second derivative $\beta_2$, the better the efficiency with a light pulse can be expanded, in a short fiber length, in the optical fiber A. Such light pulse expansion gives rise to peak power reduction, which suppresses the generation of non-linear optical phenomena; fiber shortening, moreover, can contribute to reducing fiber manufacturing costs. The second derivative $\beta_2$ is preferably 100 ps$^2$/km or more, and as can be seen from FIG. 10, the relative refractive index difference $\Delta_1$ of the central core portion 11 is preferably 1.7% or more.

The ratio ($\beta_3/\beta_2$) should be negative, and the larger the absolute value thereof the better. As can be seen in FIG. 11, in the range that the relative refractive index difference $\Delta_1$ of the central core portion 11 is 2% or less, the absolute value of the ratio ($\beta_3/\beta_2$) becomes larger as the relative refractive index difference $\Delta_1$ increases, and, however, the ratio ($\beta_3/\beta_2$) comes to be saturated for a relative refractive index difference $\Delta_1$ of 2% or more. Such a tendency is particularly noticeable when the relative refractive index difference $\Delta_2$ of the depressed portion 12 is –0.3%. The relative refractive index difference $\Delta_1$ of the central core portion 11 is preferably 2.0% or more with a view of increasing the absolute value of the ratio ($\beta_3/\beta_2$).

Next, specific examples of the optical fiber A according to the first embodiment will be explained. FIG. 12 is a table summarizing the characteristics of samples 1 through 26 of the optical fiber A according to the first embodiment. The table lists, from left to right, the relative refractive index difference $\Delta_1$ of the central core portion 11, the relative refractive index difference $\Delta_2$ of the depressed portion 12, the ratio Ra(=2a/2b) of the central core portion 11 to the depressed portion 12, the outer diameter 2a of the central core portion 11, the second derivative $\beta_2$ of the propagation constant $\beta$ with respect to the frequency $\omega$, the third derivative $\beta_3$ of the propagation constant $\beta$ with respect to the frequency $\omega$, the ratio ($\beta_3/\beta_2$) of the third derivative $\beta_3$ to the second derivative $\beta_2$, the mode field diameter MFD(I) according to the Peterman I definition, the effective area $A_{eff}$, the bending loss in a 40 mm-diameter wound condition, and the bending loss in a 60 mm-diameter wound condition. These characteristics are values measured at the wavelength of 1.05 µm. The cable cutoff wavelengths of the samples 1 through 26 of the optical fiber A according to the first embodiment can be well shorter than 1000 nm, without any problem.

Preferably, in particular, the absolute value of the ratio ($\beta_3/\beta_2$) and the second derivative $\beta_2$ can both increase when the relative refractive index difference $\Delta_1$ of the central core portion 11 is higher than 2.0%, the relative refractive index difference $\Delta_2$ of the depressed portion 12 is smaller than –0.5%, and the ratio Ra falls within the range of 0.3 to 0.6.

The optical fibers of samples 8, 18 and 26 are insensitive to bending, and hence can be wound in small coils having a diameter of 30 mm or less, being therefore preferable in terms of reducing package size. The bending loss of the optical fiber of sample 23 is not so small, but pose no problem if coiled to a diameter of about 120 mm. The bending loss of the optical fibers of sample 9 and 14 are not so small, but poses no problem when being wound in a diameter of about 100 mm. The bending loss of the optical fibers of sample 10 and 15 are not so small, but pose no problem when being wound in a diameter of about 80 mm. In the optical fiber of sample 22, the change of the ratio ($\beta_3/\beta_2$) as a result of a change in the core diameter 2a is not small, as described above. The optical fiber can be fabricated without problems, however, by employing the manufacturing technology described in the above mentioned Patent Document 1.

In the optical fibers of samples 1 through 26, the core diameter 2a falls within the range of 1.45 to 3.88 µm, the second derivative $\beta_2$ at the wavelength of 1.05 µm falls within the range of 56 to 261 ps$^2$/km, the third derivative $\beta_3$ falls within the range of –1.80 to –0.12 ps$^3$/km, the ratio ($\beta_3/\beta_2$) falls within the range of –0.0069 to –0.0020 ps, the modefield diameter falls within the range of 2.9 to 4.6 µm, the effective area falls within the range of 4.3 to 9.9 µm$^2$, and the bending loss in a 40 mm-diameter wound condition falls within the range of 0.0001 to 75 dB/m.

Figure 13:
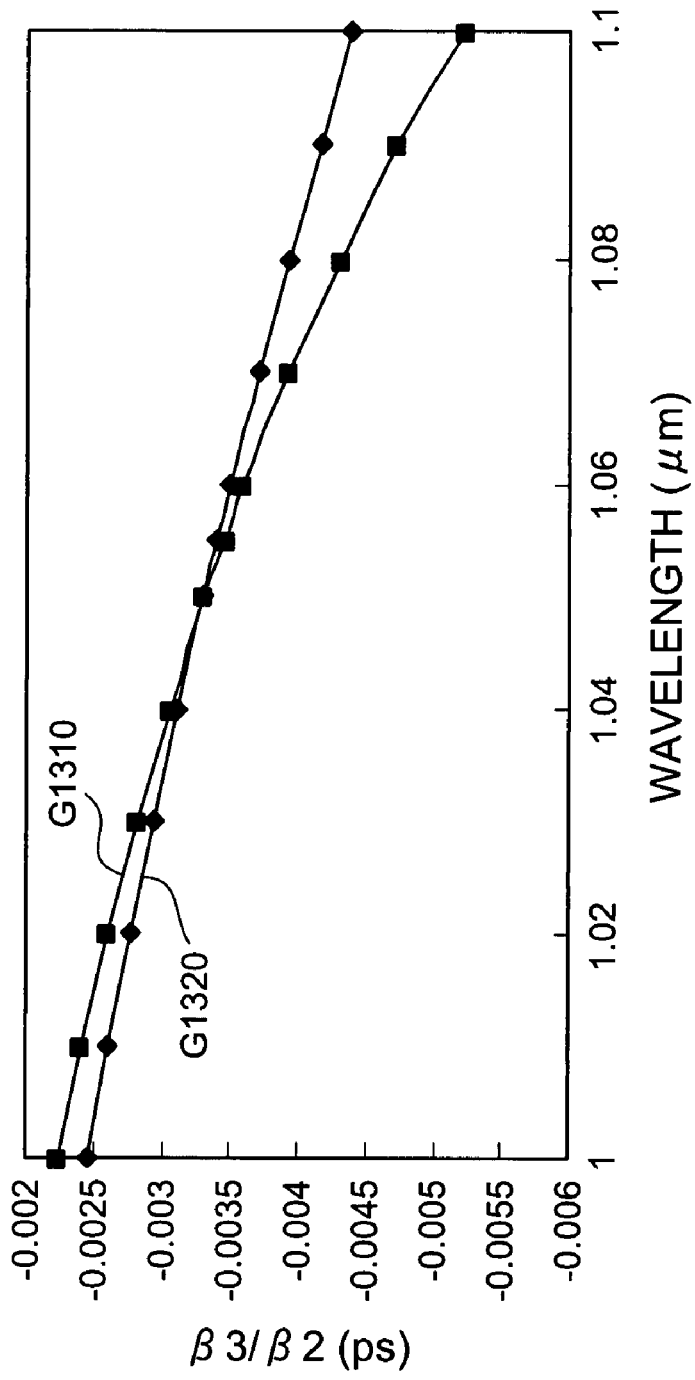
FIG. 13 is a graph showing the wavelength dependency of the ratio $(\beta_3/\beta_2)$ of other samples prepared as the optical fiber of the first embodiment.

FIG. 13 is a graph showing the wavelength dependency of the ratio ($\beta_3/\beta_2$) of other samples 31 and 32 prepared as the optical fiber A according to the first embodiment. In FIG. 13, the graph G1310 indicates measurement results for the optical fiber of sample 31, and graph G1320 those for the optical fiber of sample 32. The wavelength dependency of the ratio ($\beta_3/\beta_2$) is preferably small. In the optical fiber of sample 31, the relative refractive index difference $\Delta_1$ of the central core portion 11 is set to 2.5%, the relative refractive index difference $\Delta_2$ of the depressed portion 12 to –0.7%, the outer diameter 2a of the central core portion 11 to 1.8 µm, and the ratio Ra to 0.40. At the wavelength of 1.05 µm, the second derivative $\beta_2$ of the optical fiber of sample 31 is 140 ps$^2$/km, the third derivative $\beta_3$ is –0.47 ps$^3$/km and the fourth derivative $\beta_4$ is 0.0026 ps$^4$/km. In the optical fiber of sample 32, the relative refractive index difference $\Delta_1$ of the central core portion 11 is set to 2.5%, the relative refractive index difference $\Delta_2$ of the depressed portion 12 to –0.7%, the outer diameter 2a of the central core portion 11 to 1.8 µm, and the ratio Ra to 0.44. At the wavelength of 1.05 µm, the second derivative $\beta_2$ of the optical fiber of sample 32 is 169 ps$^2$/km, the third derivative $\beta_3$ is –0.56 ps$^3$/km and the fourth derivative P4 is 0.0027 ps$^4$/kM. The wavelength dependency of the ratio ($\beta_3/\beta_2$) is small in both samples 31 and 32, although the optical fiber of sample 32 is preferable as it exhibits a smaller wavelength dependency.

Figure 14:
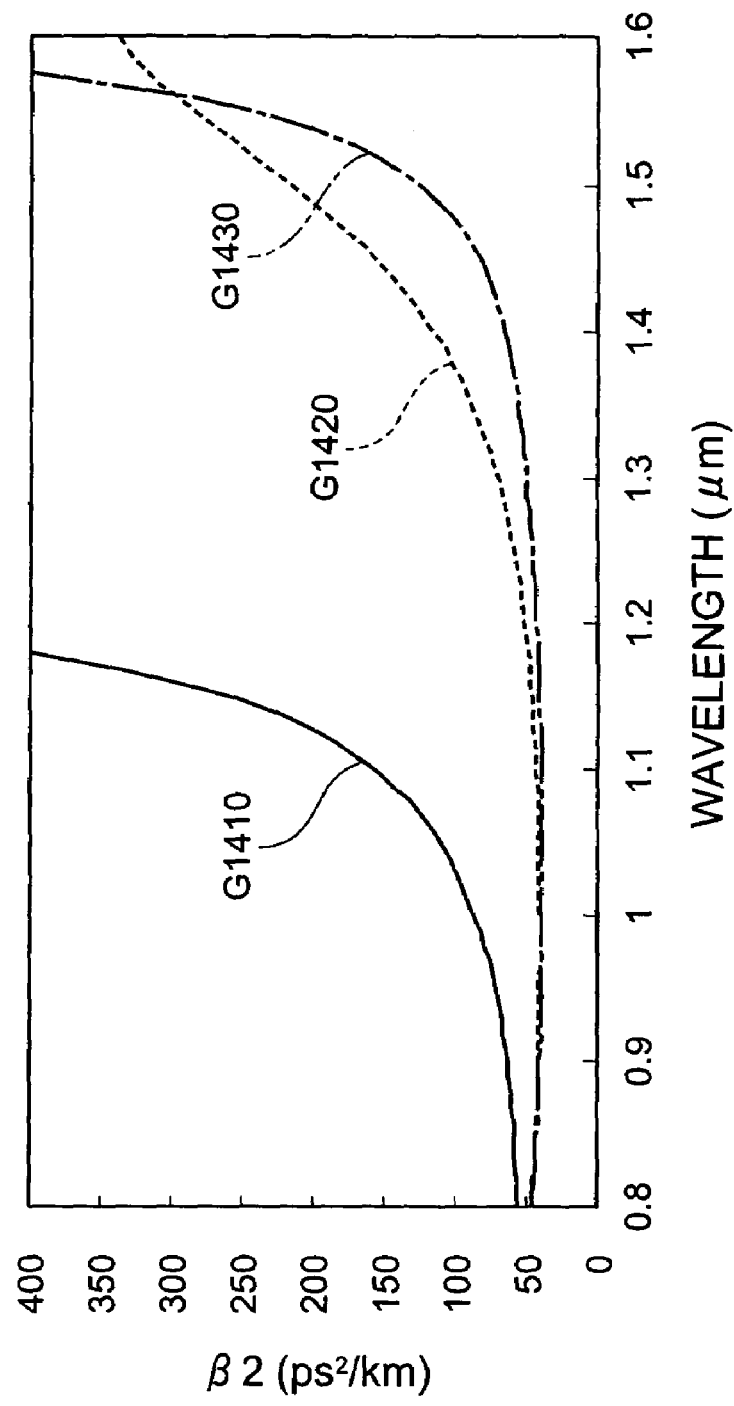
FIG. 14 is a graph showing the wavelength dependency of the second derivative $\beta_2$ in another sample prepared as the optical fiber according to the first embodiment, together with the wavelength dependency of the second derivative $\beta_2$ in plural samples of a dispersion-compensating optical fiber prepared as a comparative example.
Figure 15:
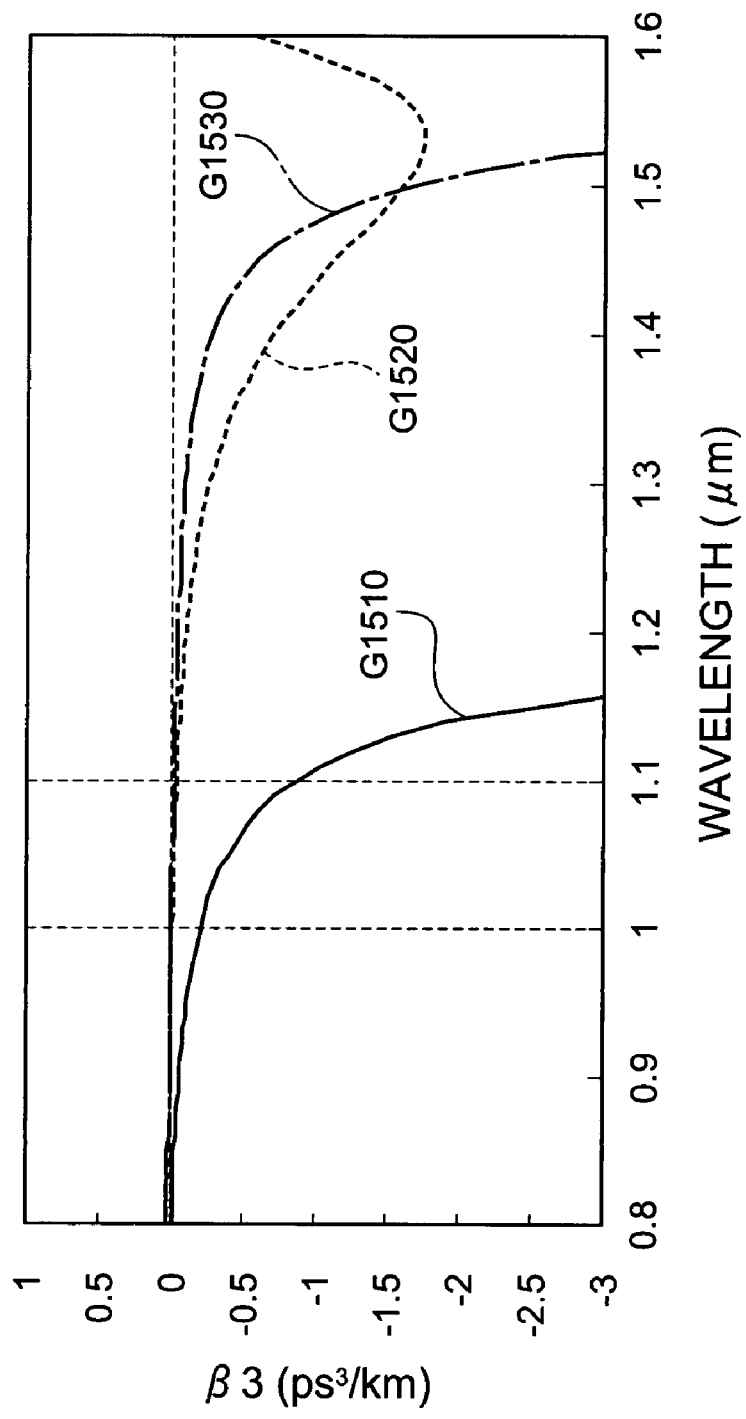
FIG. 15 is a graph showing the wavelength dependency of the third derivative $\beta_3$ in another sample prepared as the optical fiber according to the first embodiment, together with the wavelength dependency of the third derivative $\beta_3$ in plural samples of a dispersion-compensating optical fiber prepared as a comparative example.
Figure 16:
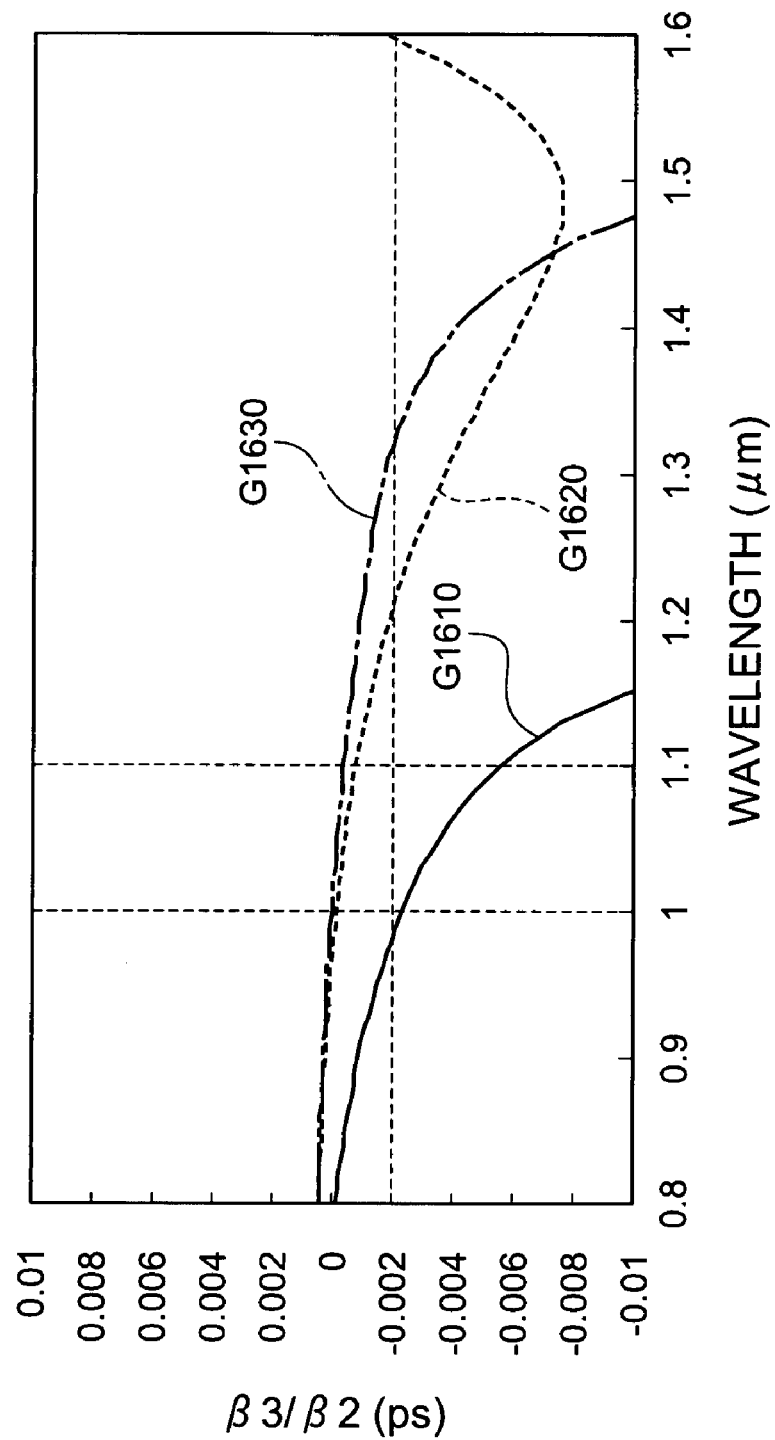
FIG. 16 is a graph showing the wavelength dependency of the ratio ($\beta_3/\beta_2$) in another sample prepared as the optical fiber according to the first embodiment, together with the wavelength dependency of the ratio ($\beta_3/\beta_2$) in plural samples of a dispersion-compensating optical fiber prepared as a comparative example.

FIG. 14 is a graph showing the wavelength dependency of the second derivative $\beta_2$ in yet another sample 41 prepared as the optical fiber A according to the first embodiment. FIG. 15 is a graph showing the wavelength dependency of the third derivative $\beta_3$ in yet another sample 41 prepared as the optical fiber A according to the first embodiment. FIG. 16 is a graph showing the wavelength dependency of the ratio ($\beta_3/\beta_2$) in yet another sample 41 prepared as the optical fiber A according to the first embodiment. FIGS. 14 to 16 show also measurement results for samples 42 and 43 of dispersion compensating fibers used in communications, as comparative examples. In FIG. 14, the graph G1410 indicates measurement results for the optical fiber of sample 41, the graph G1420 indicates those for the dispersion-compensation optical fiber of comparative sample 42, and the graph G1430 indicates those for the dispersion-compensation optical fiber of comparative sample 43. In FIG. 15, the graph G1510 indicates measurement results for the optical fiber of sample 41, the graph G1520 indicates those for the optical fiber of sample 42, and the graph G1530 indicates those for the optical fiber of sample 43. In FIG. 16, the graph G1610 indicates measurement results for the optical fiber of sample 41, the graph G1620 indicates those for the optical fiber of sample 42, and the graph G1630 indicates those for the optical fiber of sample 43.

In FIGS. 14 to 16, the relative refractive index difference $\Delta_1$ of the central core portion in the optical fiber of sample 41 is set to 2.0%, the relative refractive index difference $\Delta_2$ of the depressed portion to −0.75%, the outer diameter $2a$ of the central core portion to 1.42 µm, and the ratio Ra to 0.52. The comparative sample 42 is a dispersion-compensating optical fiber for compensating a chromatic dispersion of a standard single-mode optical fiber, which has a zero-dispersion wavelength in the vicinity of the wavelength of 1.3 µm, at the wavelength of 1.55 µm, the optical fiber exhibiting a chromatic dispersion of −223 ps/nm/km and a dispersion slope of −0.750 ps/nm²/km at the wavelength of 1.55 µm. The comparative sample 43 is a dispersion-compensating optical fiber for compensating a chromatic dispersion of a non-zero dispersion-shifted optical fiber, which has a zero-dispersion wavelength in the vicinity of the wavelength of 1.5 µm, at the wavelength of 1.55 µm, the optical fiber exhibiting a chromatic dispersion of −188 ps/nm/km and a dispersion slope of −3.39 ps/nm²/km at the wavelength of 1.55 µm.

As can be seen from FIGS. 14 to 16, both the optical fiber A according to the first embodiment and the optical fiber B according to the comparative example share the feature of having a positive second derivative $\beta_2$ and a negative third derivative $\beta_3$, not only in the 1.55 µm wavelength band, but also in the 1 µm wavelength band. As can be seen from FIG. 14, however, the second derivative $\beta_2$ at the wavelength of 1.05 µm in the optical fiber A according to the first embodiment exceeds 100 ps²/km, against about 40 ps²/km for the optical fiber B according to the comparative example. As can be seen from FIG. 15, the third derivative $\beta_3$ at the wavelength of 1.05 µm in the optical fiber A according to the first embodiment, of −0.5 ps³/km, is smaller than that of the optical fiber B according to the comparative example, which is substantially 0. Furthermore, as can be seen from FIG. 16, the ratio $(\beta_3/\beta_2)$ at the wavelength of 1.05 µm in the optical fiber A according to the first embodiment, of −0.002 ps, is smaller than that of the optical fiber B according to the comparative example, which is substantially 0. Thus, the optical fiber according to the present invention can be clearly distinguished from a conventional dispersion-compensating optical fiber.

The optical fiber according to the present invention can be used in a wound condition like a coil. FIG. 17 shows the constitution of an embodiment of an optical fiber coil according to the present invention, such that the above-described optical fiber A according to the first embodiment can be used in this optical fiber coil. In FIG. 17, the area (a) shows a perspective-view diagram of an optical fiber coil using the optical fiber A according to the first embodiment, and the area (b) shows a cross sectional diagram thereof. As shown in the area (a) of FIG. 17, the diameter of the optical fiber A coiled on a trunk section 310 of a bobbin 300 (outer diameter of the trunk section 310) is 120 mm or less, preferably 60 mm or less, and yet more preferably 40 mm or less. A single end or both ends of the coiled optical fiber A may be fusion-spliced with a connection optical fiber (for instance, an ordinary single-mode optical fiber, an optical fiber having a cutoff wavelength of 1.0 µm or less) or a pigtail connector 330 (an optical connector 330 to which one end of an ordinary optical fiber 320 is attached, as shown in the area (a) of FIG. 17). The splicing loss of the fusion splicing portion S is preferably no larger than 0.5 dB/end; herein, all the optical fiber samples prepared in the first embodiment satisfy this value.

Other than the optical fiber A having the above-described structure, the optical fiber according to the present invention may also be, for instance, and optical fiber having a small refractive index portion along the central axis, obtained as a result of the manufacturing method, or an optical fiber having one or more large-refractive index or small-refractive index layers between the depressed portion and the cladding portion.

Second Embodiment

Figure 18:
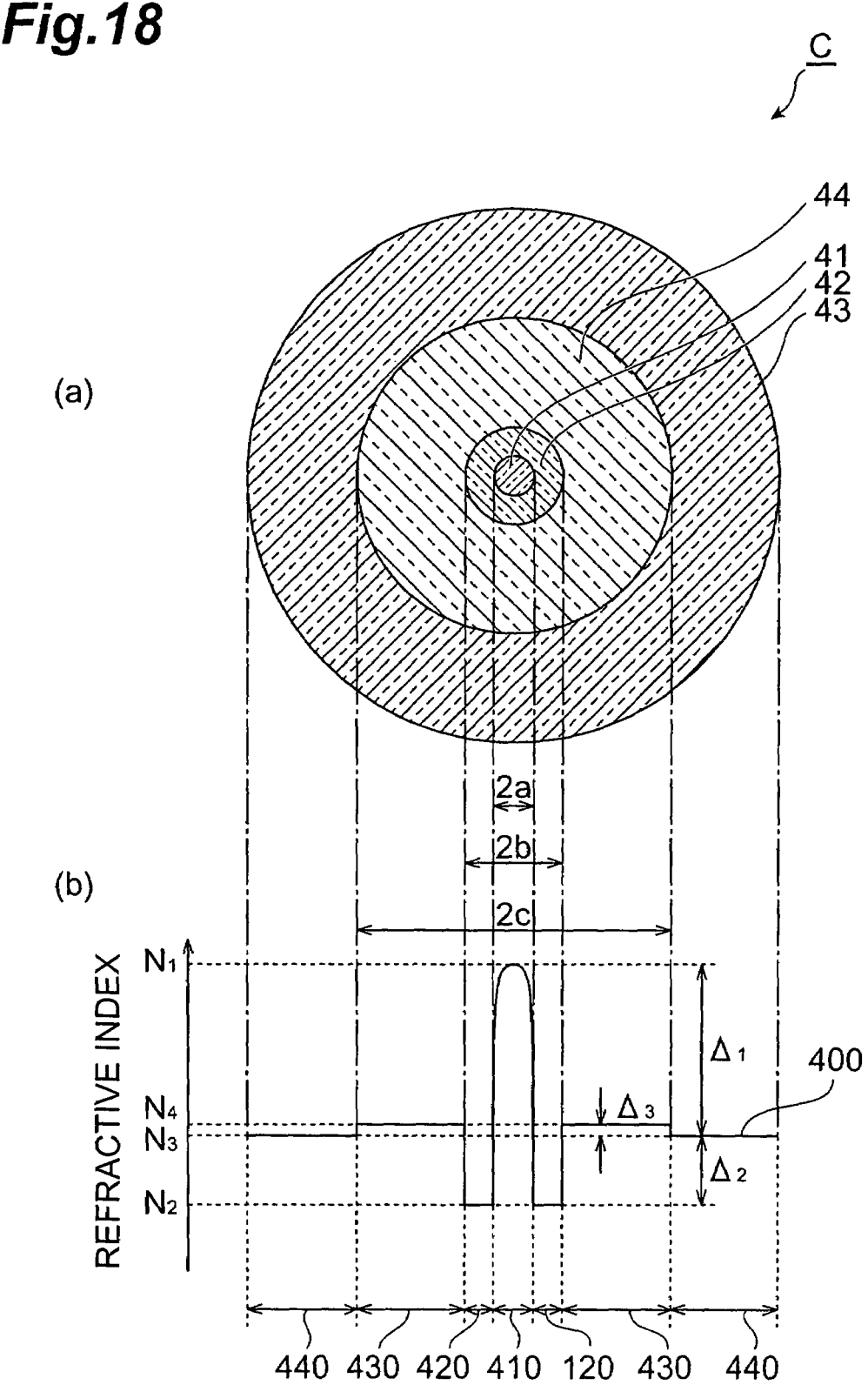
FIG. 18 shows a cross sectional structure of a second embodiment of an optical fiber according to the present invention, and a refractive index profile thereof.

FIG. 18 shows the structure of an optical fiber C according to a the present invention; the area (a) shows the cross sectional structure of the optical fiber C according to the second embodiment, while the area (b) shows the refractive index profile thereof. In similar to the optical fiber A according to the above-described first embodiment, the optical fiber C according to the second embodiment can also be used in an optical fiber coil such as the one shown in FIG. 17.

As shown in the area (a) of FIG. 18, the optical fiber C according to the second embodiment comprises: a central core portion 41 having a maximum refractive index $N_1$ and an outer diameter $2a$; a depressed portion 42, provided on the outer periphery of the central core portion 41, having a minimum refractive index $N_2$ and an outer diameter $2b$; a cladding portion 43, provided on the outer periphery of the depressed portion 42, having a maximum refractive index $N_3$; and a ring portion 44, provided between the depressed portion 42 and the cladding portion 43, having a maximum refractive index $N_4$ and an outer diameter $2c$. The refractive indices of the central core portion 41, the depressed portion 42 and the cladding portion 43 satisfy the same magnitude correlation as in the above-described first embodiment, but the refractive index $N_4$ of the central ring portion 44 is smaller than the refractive index $N_1$ of the central core portion 41 and larger than the refractive index $N_3$ of the cladding portion 43.

The area (b) of FIG. 18 shows a refractive index profile 400 of the optical fiber C according to the second embodiment; in this refractive index 400, the region 410 denotes the refractive index in the radial direction of the central core portion 41, the region 420 denotes the refractive index in the radial direction of the depressed portion 42, the region 430 denotes the refractive index in the radial direction of the ring portion 44, and the region 430 denotes the refractive index in the radial direction of the cladding portion 43.

In the following, the transmission characteristics of the optical fiber C according to the second embodiment will be explained by comparison with the optical fiber A according to the first embodiment. In a sample 51 prepared as the optical fiber A according to the first embodiment, the relative refractive index difference $\Delta_1$ of the central core portion with respect to the cladding portion is set to 2.68%, the relative refractive index difference $\Delta_2$ of the depressed portion with respect to the cladding portion is set to −0.77%, and the ratio Ra(=$2a/2b$) is set to 0.36. In a sample 52 prepared as the optical fiber C according to the second embodiment, the relative refractive index difference $\Delta_1$ of the central core portion with respect to the cladding portion is set to 2.75%, the relative refractive index difference $\Delta_2$ of the depressed portion with respect to the cladding portion is set to −0.70%, the relative refractive index difference $\Delta_3$ of the ring portion with respect to the cladding portion is set to 0.07%, the ratio Ra(=$2a/2b$) is set to 0.36, and the ratio Rb(=$2b/2c$) is set to 0.22.

Figure 19:
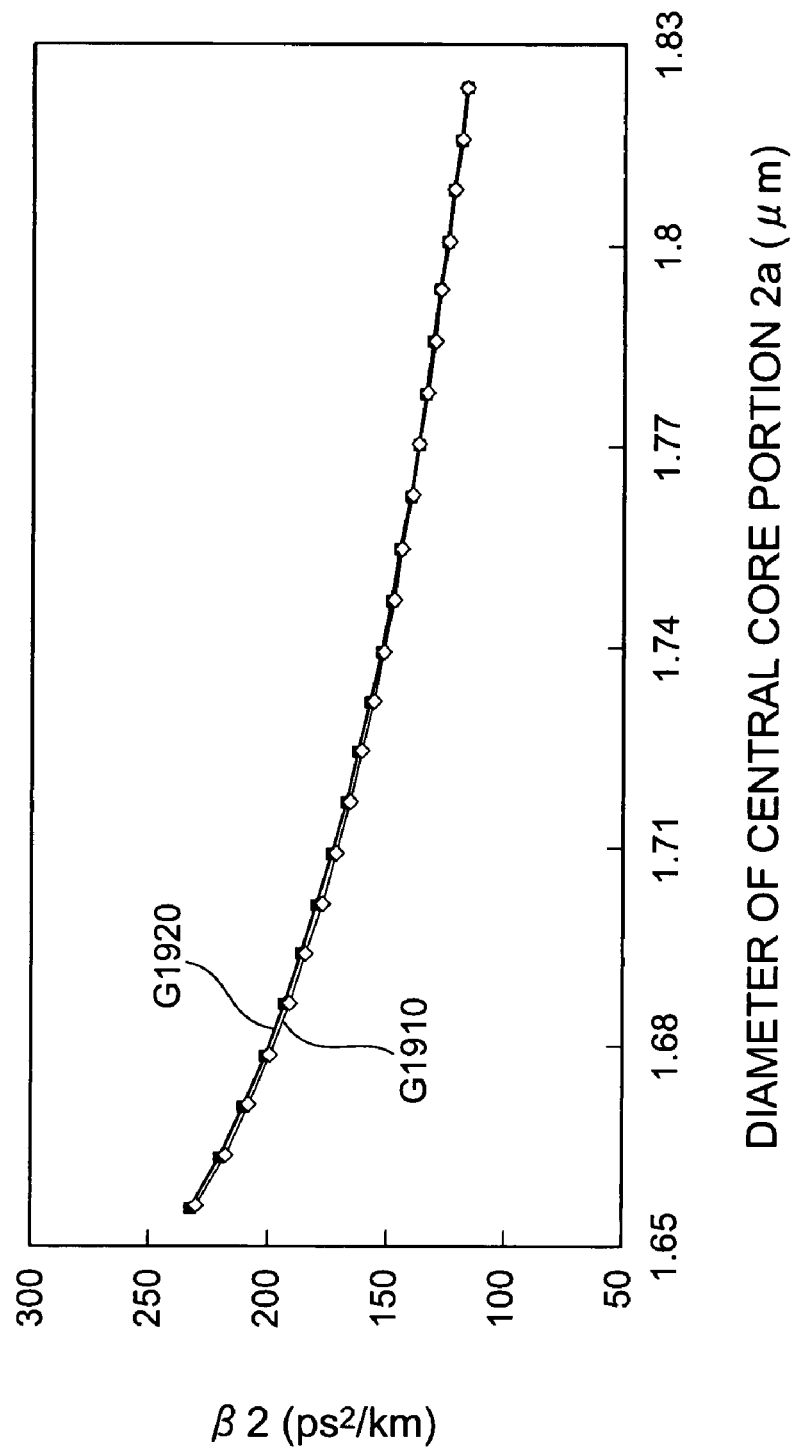
FIG. 19 is a graph showing the relationship between the second derivative $\beta_2$ and the outer diameter $2a$ of the central core portion in samples of the optical fibers according to the first and the second embodiments respectively.
Figure 20:
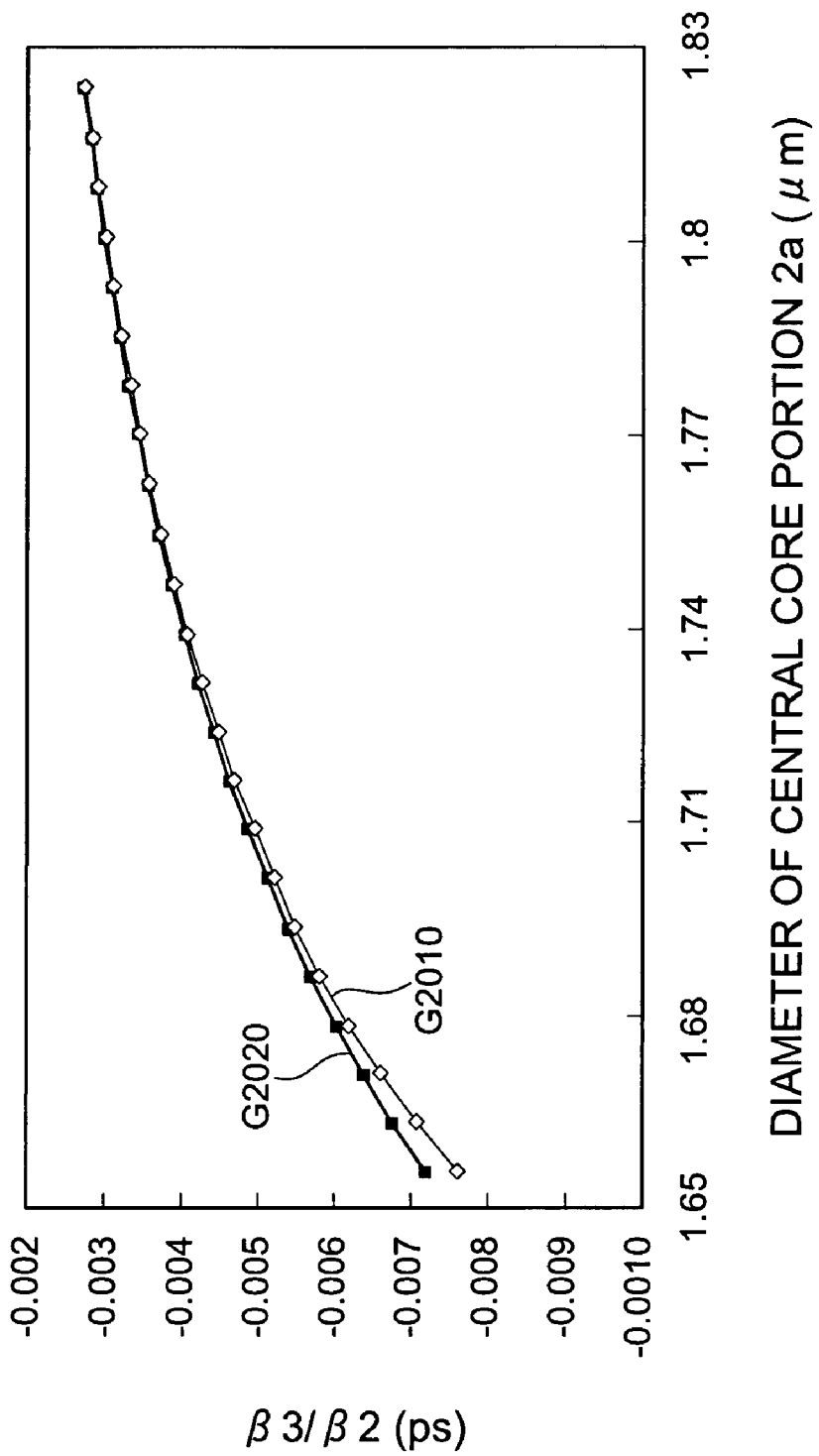
FIG. 20 is a graph showing the relationship between the ratio ($\beta_3/\beta_2$) and the outer diameter $2a$ of the central core portion in samples of the optical fibers according to the first and the second embodiments respectively.
Figure 21:
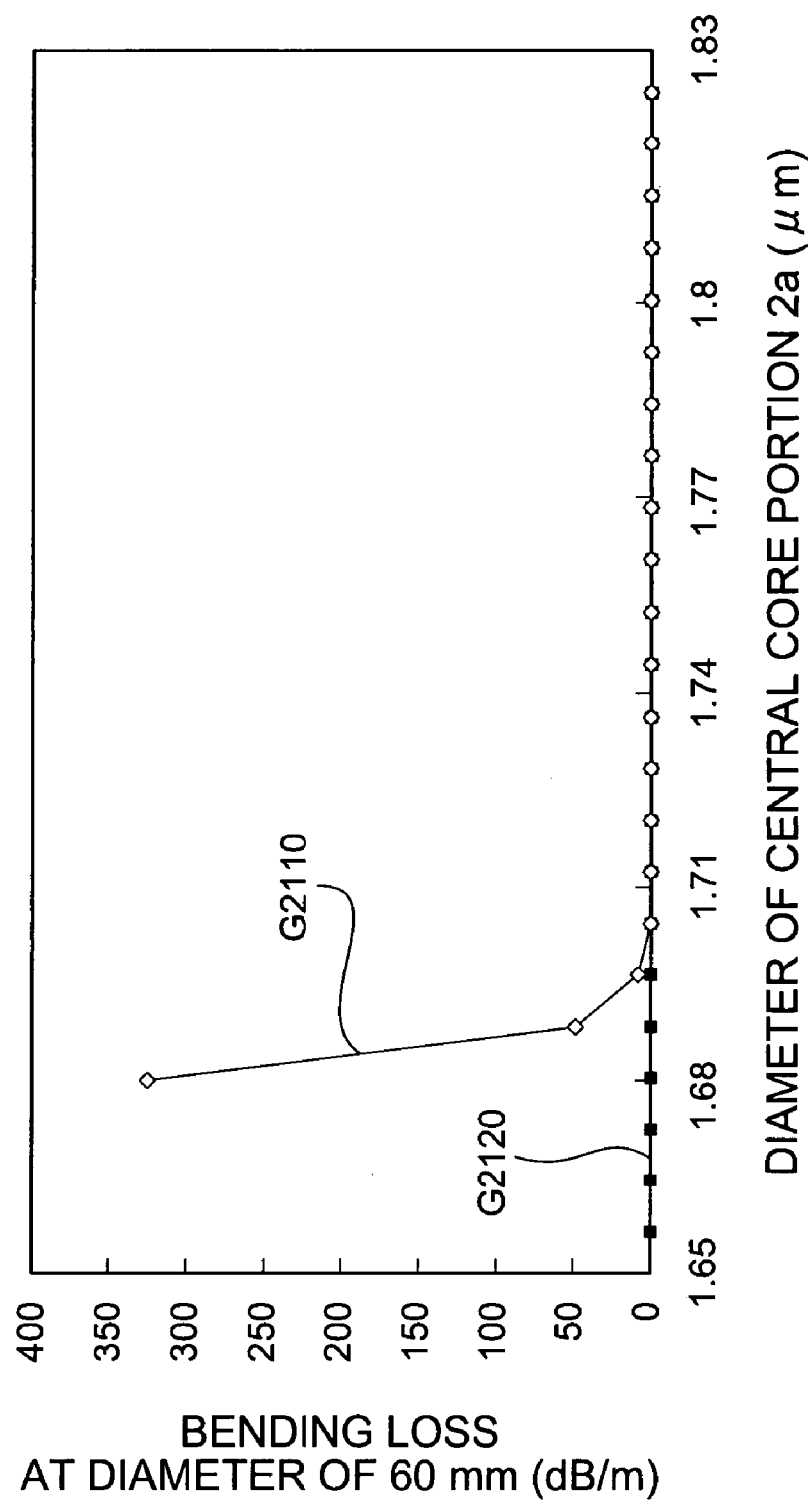
FIG. 21 is a graph showing the relationship between the 60 mm-diameter bending loss and the outer diameter $2a$ of the central core portion in samples of the optical fibers according to the first and the second embodiments respectively.

FIG. 19 is a graph showing the relationship between the outer diameter $2a$ of the central core portion and the second derivative $\beta_2$ in the optical fibers of samples 51 and 52. In FIG. 19, the graph G1910 indicates measurement results for the optical fiber of sample 51, and the graph G1920 indicates those for the optical fiber of sample 52. FIG. 20 is a graph showing the relationship between the outer diameter $2a$ of the central core portion and the ratio $(\beta_3/\beta_2)$ in the optical fibers of samples 51 and 52. In FIG. 20, the graph G2010 indicates measurement results for the optical fiber of sample 51, and the graph G2020 indicates those for the optical fiber of sample 52. FIG. 21 is a graph showing the relationship between the outer diameter 2*a* of the central core portion and the bending loss at a diameter of 60 mm in the optical fibers of samples 51 and 52. In FIG. 21, the graph G2110 indicates measurement results for the optical fiber of sample 51, and the graph G2120 indicates those for the optical fiber of sample 52. The wavelength used for the measurements of FIGS. 19 to 21 is 1050 nm.

As can be seen from FIGS. 19 and 20, the optical fibers of samples 51 and 52 exhibit virtually no difference as regards the relationship between core diameter and $\beta_2$, and core diameter and $\beta_3/\beta_2$, but the optical fiber of sample 52, which exhibits a smaller 60 mm-diameter bending loss, allows coiling to a more reduced size. For an identical coil size, the optical fiber of sample 52 affords a larger absolute value of $\beta_3/\beta_2$. In the case of a core diameter of 1.68 μm or less and a $\beta_3/\beta_2$ of −0.006 ps or less, in particular, coiling becomes difficult in optical fibers having a structure lacking a ring portion, such as the optical fiber of sample 51; when the optical fiber has a structure comprising a ring portion, as the optical fiber of sample 52, however, sufficient coiling can be achieved even for a $\beta_3/\beta_2$ of −0.007 ps or less.

Figure 22:
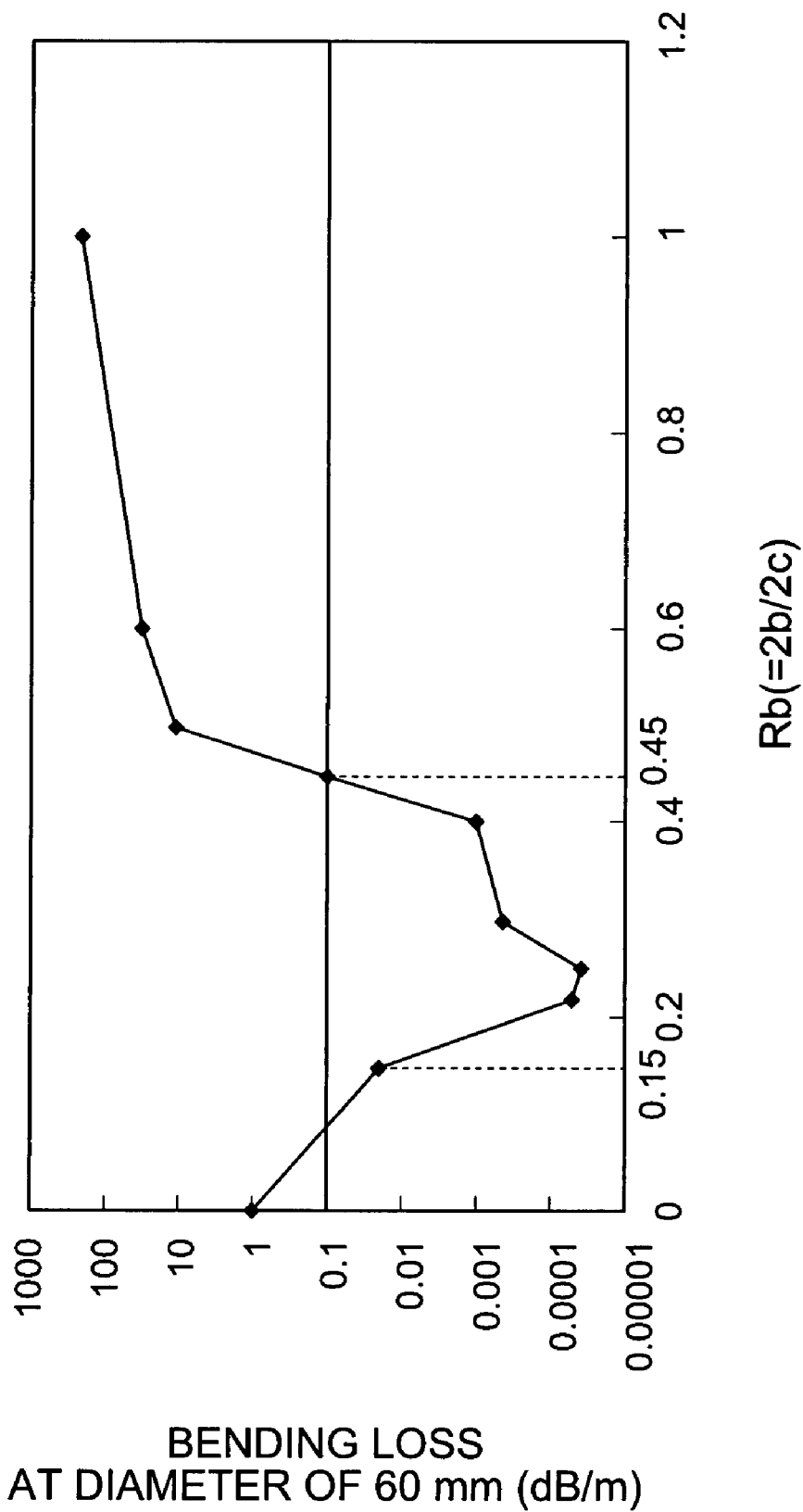
FIG. 22 shows the relationship between the ratio $Rb=(2b/2c)$ and the bending loss at a diameter of 60 mm in the optical fiber according to the second embodiment.

FIG. 22 shows measurement results of the bending loss at a diameter of 60 mm in the optical fiber of sample 52 upon changes of the ratio Rb=(2*b*/2*c*). The wavelength used for the measurements is also 1050 nm.

Ordinarily, the bending loss is desirably 0.1 dB/m or less, and hence FIG. 22 shows that the ratio Rb ranges preferably from 0.15 to 0.45. The Rb range varies depending on the respective refractive index differences of the central core portion, the depressed portion and the ring portion, with respect to the cladding portion, and also depending on, for instance, the target $\beta_3/\beta_2$ and the use frequency.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The optical fiber according to the present invention can be applied to a seed light pulse source for about 100 femtoseconds or less, a light source apparatus for obtaining SC (Supercontinuum) light that is a broad-band light pulse.

The invention claimed is:

1. An optical fiber comprising at least: a central core portion having a maximum refractive index $N_1$ and an outer diameter 2*a*; a depressed portion, provided on an outer periphery of said central core portion, having a minimum refractive index $N_2$ and an outer diameter 2*b*; and a cladding portion, provided on an outer periphery of said depressed portion, having a maximum refractive index $N_3$, wherein said respective maximum refractive indices of said central core portion, said depressed portion and said cladding portion satisfy the following relationship:

$N_1 > N_3 > N_2$, wherein a relative refractive index difference $\Delta_1$ of said central core portion with respect to said cladding portion is larger than 1.0%, and a relative refractive index difference $\Delta_2$ of said depressed portion with respect to said cladding portion is smaller than −0.3%, and wherein, at a wavelength of 1.05 μm, the second derivative $\beta_2$ of the propagation constant $\beta$ with respect to frequency $\omega$ is positive, the third derivative $\beta_3$ of the propagation constant $\beta$ with respect to frequency $\omega$ is negative, and the ratio ($\beta_3/\beta_2$) of the third derivative $\beta_3$ to the second derivative $\beta_2$ is −0.002 ps or less.

2. An optical fiber according to claim 1, wherein a ratio Ra(=2*a*/12*b*) of the outer diameter 2*a* of said central core portion to the outer diameter 2*b* of said depressed portion is 0.2 or more but less than 0.6.

3. An optical fiber according to claim 1, wherein the relative refractive index difference $\Delta_1$ of said central core portion is 1.7% or more.

4. An optical fiber according to claim 1, wherein the relative refractive index difference $\Delta_2$ of said depressed portion is −0.5% or less.

5. An optical fiber according to claim 1, wherein the outer diameter 2*a* of said central core portion is 1.4 μm or more but 4.0 μm or less.

6. An optical fiber according to claim 1, having a bending loss of 100 dB/m or less at the wavelength of 1.05 μm, while being wound in a diameter of 40 mm.

7. An optical fiber according to claim 1, further comprising a ring portion, provided between said depressed portion and said cladding portion, having a maximum refractive index $N_4$ and an outer diameter 2*c*, wherein the respective maximum refractive indices of said central core portion, said depressed portion, said ring portion and said cladding portion satisfy the following relationship:

$N_1 > N_4 > N_3 > N_2$.

8. An optical fiber coil including an optical fiber according to claim 1, while being winded into a coil shape.

9. An optical fiber coil according to claim 8, wherein the minimum wound diameter of said optical fiber is 120 mm or less.

* * * * *